US012567270B1

(12) United States Patent

Hicks et al.

(10) Patent No.: US 12,567,270 B1

(45) Date of Patent: Mar. 3, 2026

(54) ON-DEMAND STATE VERIFICATION USING DIGITAL IMAGE PROCESSING AND ARTIFICIAL INTELLIGENCE

(71) Applicant: Squint, Inc., San Jose, CA (US)

(72) Inventors: Jacob Hicks, Longview, TX (US); Grant Gliner, Brooklyn, NY (US); Devin Bhushan, San Francisco, CA (US); Alexander Young, New York, NY (US); Jim Zhu, San Francisco, CA (US); Benjamin Weaver, San Francisco, CA (US); Dane Laughlin, Wichita, KS (US)

(73) Assignee: Squint, Inc., San Jose, CA (US)

( * ) Notice: Subject to any disclaimer, the term of this patent is extended or adjusted under 35 U.S.C. 154(b) by 0 days.

(21) Appl. No.: 19/312,643

(22) Filed: Aug. 28, 2025

(51) Int. Cl.
*G06V 20/70* (2022.01)
*G06F 40/169* (2020.01)
*G06F 40/30* (2020.01)
*G06F 40/40* (2020.01)

(52) U.S. Cl.
CPC ............ *G06V 20/70* (2022.01); *G06F 40/169* (2020.01); *G06F 40/30* (2020.01); *G06F 40/40* (2020.01)

(58) Field of Classification Search
CPC ....... G06V 20/70; G06F 40/169; G06F 40/30; G06F 40/40
See application file for complete search history.

(56) References Cited

U.S. PATENT DOCUMENTS

| | | | |
|---|---|---|---|
| 9,955,123 B2 | 4/2018 | Oostendorp et al. | |
| 10,110,858 B2 * | 10/2018 | Loce ...................... | H04N 7/183 |
| 10,440,504 B2 | 10/2019 | Rose, Jr. et al. | |
| 11,893,836 B1 | 2/2024 | Knas et al. | |
| 2014/0126790 A1 | 5/2014 | Duchesne et al. | |
| 2025/0005293 A1 * | 1/2025 | Nguyen ................. | G06F 40/30 |
| 2025/0005918 A1 * | 1/2025 | Willmott ............... | G06V 10/86 |
| 2025/0037424 A1 * | 1/2025 | Uziel ................... | G06V 10/764 |
| 2025/0045256 A1 * | 2/2025 | Gottlob ................ | G06F 16/211 |
| 2025/0077566 A1 * | 3/2025 | Gupta ............... | G06F 16/90332 |
| 2025/0094821 A1 * | 3/2025 | Hettige ............... | G06N 3/0475 |
| 2025/0111220 A1 * | 4/2025 | Jones ...................... | G06N 3/08 |
| 2025/0131027 A1 * | 4/2025 | Chen ..................... | G06F 16/338 |
| 2025/0200392 A1 * | 6/2025 | Whalen ................. | G06N 5/013 |
| 2025/0232239 A1 * | 7/2025 | Kelsey ............ | G06Q 10/06316 |
| 2025/0259733 A1 * | 8/2025 | Serban .................. | G16H 50/20 |
| 2025/0266159 A1 * | 8/2025 | Rajpurkar ............. | G16H 15/00 |
| 2025/0299098 A1 * | 9/2025 | Zarkesh ................. | G06N 5/04 |

FOREIGN PATENT DOCUMENTS

EP          3198221 A1      8/2017

\* cited by examiner

*Primary Examiner* — Van D Huynh
(74) *Attorney, Agent, or Firm* — Banner & Witcoff, Ltd.

(57) ABSTRACT

Aspects of the present disclosure are directed to using AI tools such as large language models, grounded computer vision models, and visual-language models to verify that the state of a target is the desired state of the target. An image of the target and a semantic textual description of the desired state of the target may be used to determine whether the state of the target is the desired state.

20 Claims, 11 Drawing Sheets

100

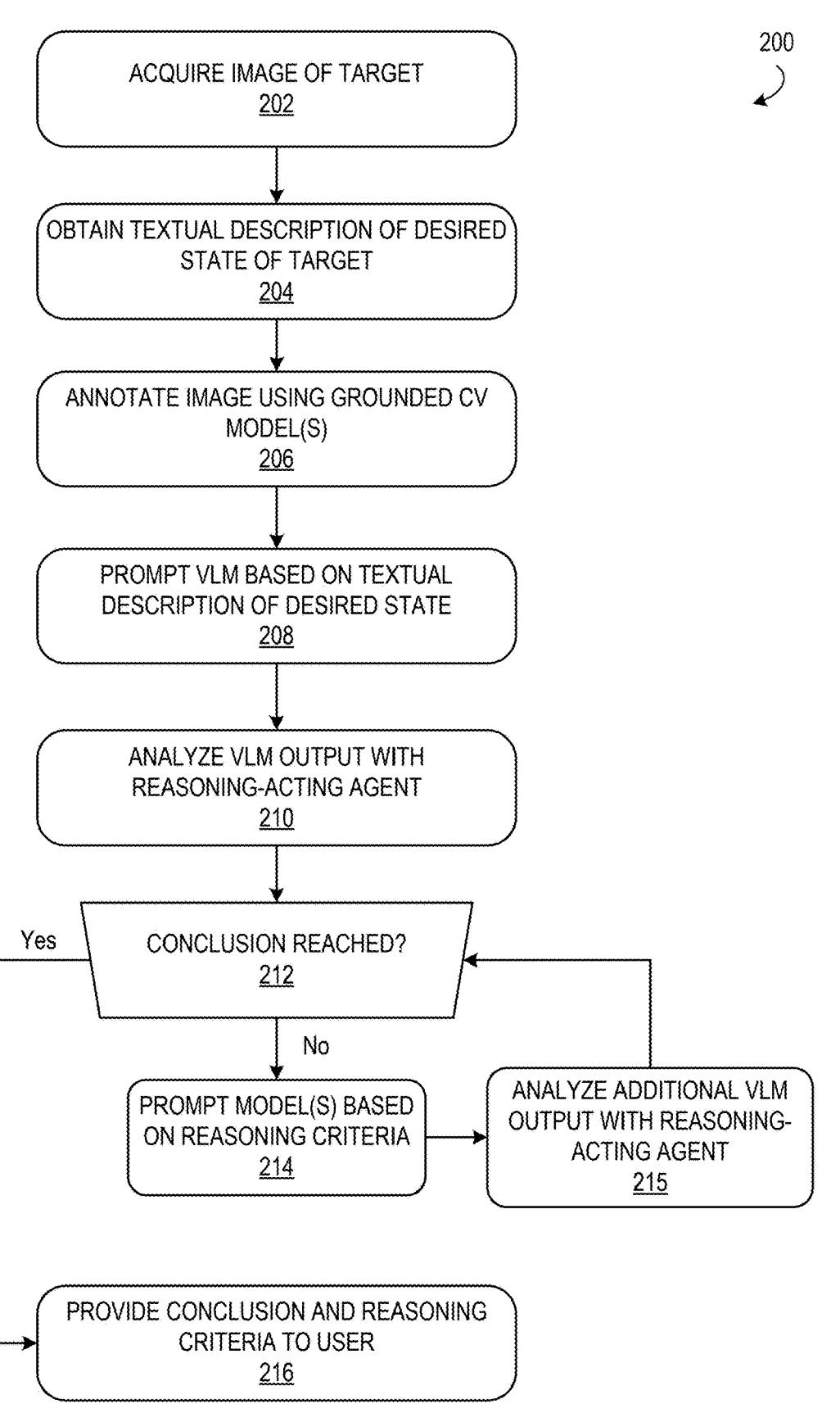

200

ACQUIRE IMAGE OF TARGET
202

OBTAIN TEXTUAL DESCRIPTION OF DESIRED
STATE OF TARGET
204

ANNOTATE IMAGE USING GROUNDED CV
MODEL(S)
206

PROMPT VLM BASED ON TEXTUAL
DESCRIPTION OF DESIRED STATE
208

ANALYZE VLM OUTPUT WITH
REASONING-ACTING AGENT
210

CONCLUSION REACHED?
212

Yes

No

PROMPT MODEL(S) BASED
ON REASONING CRITERIA
214

ANALYZE ADDITIONAL VLM
OUTPUT WITH REASONING-
ACTING AGENT
215

PROVIDE CONCLUSION AND REASONING
CRITERIA TO USER
216

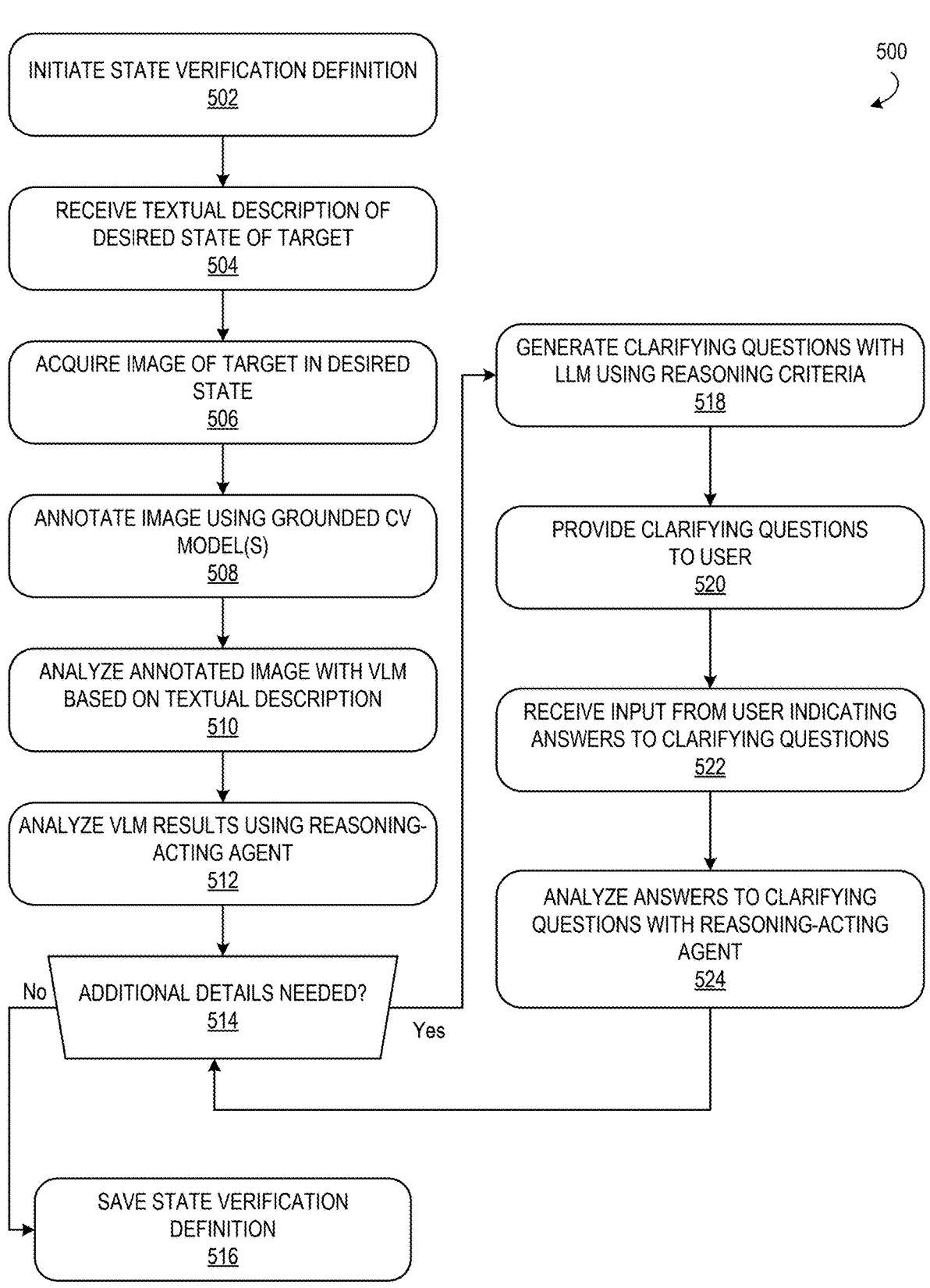

500

INITIATE STATE VERIFICATION DEFINITION
502

RECEIVE TEXTUAL DESCRIPTION OF DESIRED STATE OF TARGET
504

ACQUIRE IMAGE OF TARGET IN DESIRED STATE
506

ANNOTATE IMAGE USING GROUNDED CV MODEL(S)
508

ANALYZE ANNOTATED IMAGE WITH VLM BASED ON TEXTUAL DESCRIPTION
510

ANALYZE VLM RESULTS USING REASONING-ACTING AGENT
512

ADDITIONAL DETAILS NEEDED?
514

No

Yes

GENERATE CLARIFYING QUESTIONS WITH LLM USING REASONING CRITERIA
518

PROVIDE CLARIFYING QUESTIONS TO USER
520

RECEIVE INPUT FROM USER INDICATING ANSWERS TO CLARIFYING QUESTIONS
522

ANALYZE ANSWERS TO CLARIFYING QUESTIONS WITH REASONING-ACTING AGENT
524

SAVE STATE VERIFICATION DEFINITION
516

FIG. 5

ON-DEMAND STATE VERIFICATION USING DIGITAL IMAGE PROCESSING AND ARTIFICIAL INTELLIGENCE

FIELD

The present disclosures generally relate to digital image processing, more particularly relate to processing digital images to provide feedback regarding the state of a system, and more specifically relate to using digital image processing and artificial intelligence to indicate whether a system is in a desired state based on one or more digital images of the system.

BACKGROUND

Various organizations use standard operating procedures (SOPs) to help workers perform routine tasks in a manner aiming to achieve efficiency, quality control, and uniformity of performance. Conventionally, SOPs may be documented by an organization in user manuals or in instructional videos. Alternatively, SOPs may be conveyed by word of mouth among workers in an organization. Producing conventional SOP materials can be time- and labor-intensive. Further, errors included in SOP materials or difficulty following complex instructions in SOP materials may cause performance of procedures by workers to remain error prone.

Guided workflows may assist workers in complying with SOPs by providing structured, step-by-step procedures that lead those workers through a specific task. For example, a guided workflow provides a sequence of actions, instructions, or information to ensure consistent and accurate completion of the task. A guided workflow may break down a complex task into smaller, more manageable steps that are easier for workers to understand and complete. Guided workflows aim to ensure consistency in task performance, reduce errors, and improve overall quality. Guided workflows also may reduce the time and effort required to complete a task, in particular when performed by novice or inexperienced workers, which may reduce the need for extensive training sessions.

Guided workflows may provide similar benefits and advantages in other scenarios. For example, guided workflows likewise may help customers, end-users, and other individuals complete tasks accurately, efficiently, and timely. Advancements in computing technology have enabled guided workflows to be provided to a variety of users, in a variety of scenarios, via a variety of computing devices.

SUMMARY

The present disclosures are directed to improvements in systems providing digital guided workflows that address a limitation that has been identified in such systems. During a guided workflow, it is often necessary to confirm that the relevant system is in a desired state, for example, by visual inspection. While it may be relatively easy for individuals with sufficient knowledge to visually inspect a system and determine whether it is in a desired state, this is not a trivial task for computers. For example, a computer may be able to compare two digital images of a system and determine the systems are in different states based on detecting differences in the image such as differences at a pixel level. What is more challenging for that computer, however, is determining which objects depicted in the image have semantic meaning relevant to the desired state, determining whether any differences between those objects are meaningful differences relevant to the desired state, and determining if an image represents the desired (e.g., correct) state of the system. Even where artificial intelligence (AI) and machine learning (ML) are employed to evaluate a visual depiction of the state of a system, configuring AI/ML models to provide accurate and actionable conclusions about the state of a system may require extensive training of the AI/ML models using a corpus of images in various states with sufficient variations that yield results with sufficient confidence for subsequent input. In addition, knowledgeable individuals may be able easily to recognize what modifications are needed to transition a system from an undesired state to a desired state. But this again is not a trivial task for computers. In a scenario where a computer has determined two images depict a system in different states, determining how to transition that system from one state to the other and providing an individual appropriate guidance on what modifications are needed for that transition is a more challenging endeavor.

The disclosures herein address these challenges by providing solutions that enable individuals to verify a system is in a desired state using a single digital image of the current state of the system and a semantic description of the desired state of the system. The solutions described herein also provide, as needed, guidance on what actions to take in order to transition that system from an undesired state to a desired state based on the digital image of the current state of the system and the semantic description of the desired state. As described in further detail below, the solutions employ agentic workflows that leverage AI and ML technologies to process the digital image depicting the state of the system, evaluate objects identified in the digital image against the semantic description of a desired state of a system to render a decision as to whether the current state of the system is in the desired state, and provide feedback on the reasoning that led to that decision. Based on the feedback, an individual may modify the system and repeat the process to confirm that the modifications put the system in the desired state or receive additional feedback regarding additional modifications that may be needed.

The solutions described herein, therefore, improve systems and devices that provide digital guided workflows. Such systems and devices may include augmented reality (AR), mixed reality (MR), virtual reality (VR), and/or extended reality (XR) systems and devices. Such improvements include verifying that a system is in a desired state before beginning a desired workflow, during a guided workflow (e.g., after completing one or more steps of the guided workflow), or after completing a guided workflow. The disclosures herein will be presented by way of example in the context of digital guided workflows in an industrial setting that involves the use, operation, or maintenance of industrial machines such as those that might be found in an industrial manufacturing facility. It will be appreciated, however, that the disclosures herein are not limited to industrial contexts and are applicable to other scenarios, settings, environments, use cases, applications, and the like. For example, the disclosures herein may be applied to improve digital guided workflows for customers, employees, end-users, and other individuals in any industry, scenario, or circumstance where there is a need to quickly and efficiently confirm a system is in a desired state.

The disclosures herein also provide a solution for creating the semantic description of the desired state of a system. For example, an individual (e.g., a supervisor, administrator) may capture a digital image of a system in its desired state and provide a semantic description of the desired state. The agentic workflows may process the image during what may be referred to as a "trial run" (or "test run") in order to understand the semantic description of the desired state of the system relative to the digital image. During the "trial run," the individual may also receive feedback regarding the semantic description of the desired state. For example, during the "trial run" the agentic workflows may iteratively prompt the individual to obtain semantic details regarding the desired state or to refine the semantic details generated during the "trial run."

The solutions described herein thus may be used to, among other things, confirm compliance with SOPs, confirm that a workflow has been completed correctly, and confirm that one or more steps of a workflow has been completed correctly. The solutions described herein also may be used for diagnosing, troubleshooting, and maintenance (e.g., where visual inspection of a system can reveal defects or other issues). The solutions described herein may avoid the need to extensively train AI/ML models using a large corpus of image data and may provide more accurate indications of whether systems are in desired states relative to other approaches that involve training AI/ML models. These and other advantages will be appreciated upon review of the disclosures herein. Furthermore, the solutions described herein may avoid the need to use additional hardware (e.g., sensors, monitors, etc.) to verify that multiple components of a system (e.g., switches, knobs, valves, settings, conditions, etc.) are in a desired state at any given time thereby reducing costs associated with verifying the state of such systems and reducing the complexity of those systems.

BRIEF DESCRIPTION OF THE DRAWINGS

The present disclosure is illustrated by way of example and not limited in the accompanying figures in which like reference numerals indicate similar elements and in which:

FIG. 2 shows a flowchart of example method steps of an AI state verification process;

FIG. 5 shows a flowchart of example method steps for creating a semantic textual description of a desired state of a target;

DETAILED DESCRIPTION

Figure 1:
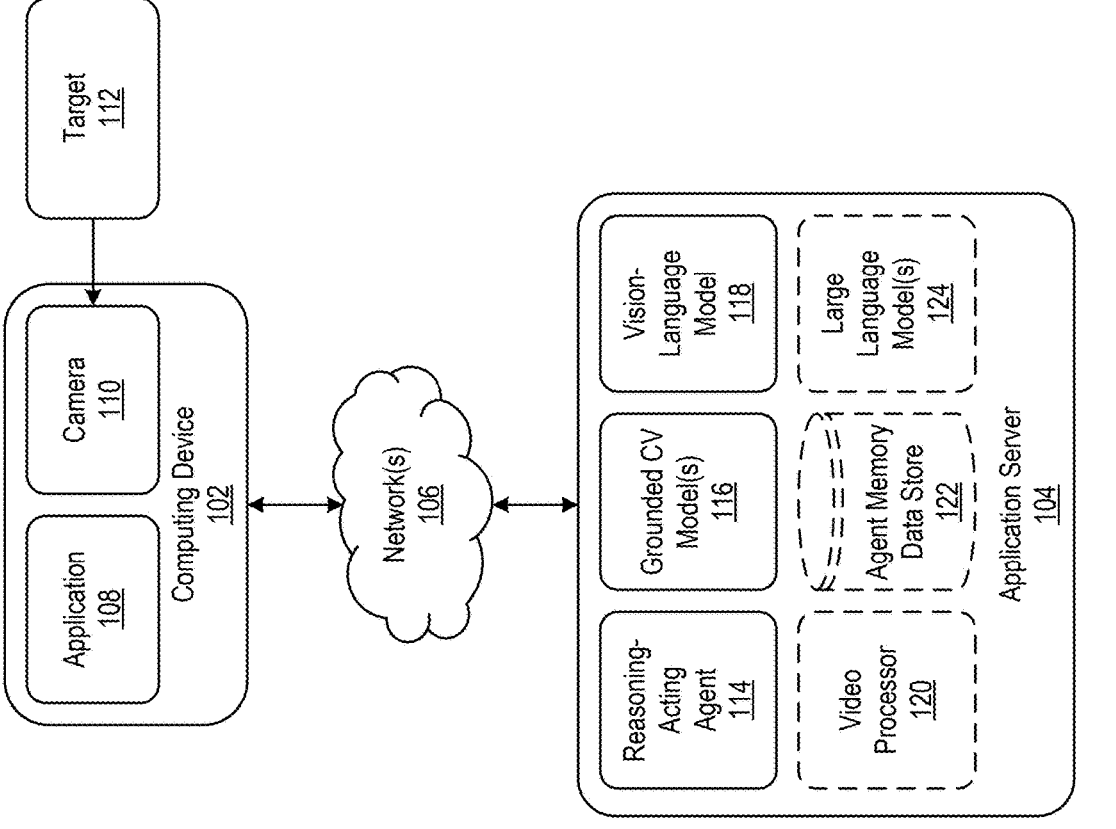
FIG. 1 shows a block diagram of an example computing environment for AI state verification.

In the following description, reference is made to the accompanying drawings, which form a part hereof, and in which is shown by way of illustration various examples in which the disclosure may be practiced. It is to be understood that other examples may be utilized and implemented whereby structural and functional modifications may be made without departing from the scope and spirit of the present disclosure. Further, headings within this disclosure should not be considered as limiting aspects of the disclosure. Those skilled in the art with the benefit of this disclosure will appreciate that the examples are not limited to the headings.

As noted above, aspects of the disclosure relate to improvements to, among other things, systems that provide digital guided workflows. The improvements disclosed herein include the ability to obtain a digital image of a state of a system and determine from that digital image whether the state of the system is the desired state of the system. Aspects of the disclosures herein, therefore, may be referred to for convenience as a state verification procedure, a state verification process, or a state verification step. Given that aspects of the disclosures utilize various AI models to carry out the state verification, aspects of the disclosures herein also may be referred to as AI state verification or AISV. As described herein, AI state verification may be employed during a step of a digital guided workflow. In that context, AISV also may refer to AI step verification conveying that the AI state verification pipeline may be used to verify that the target of the digital guided workflow is in a desired state before, during, or after a step of the digital guided workflow. It will be appreciated, however, that AI state verification may be employed in other contexts beyond digital guided workflows (e.g., non-digital guided workflows, compliance with SOPs, and the like).

In the context of a digital guided workflow, AISV may be included as a step, feature, or functional module of an application configured to present a digital guided workflow to a user. For example, an application may be configured to guide a user through a multi-step procedure. The procedure may include a sequence of instructional and/or interactive steps the user can follow. The steps of a procedure may include one or more modules of various types in various combinations. The steps of the procedure may include, for example, informational modules that provide textual information (e.g., instructions, tips, reminders, warnings, and the like), contextual modules that provide visual information (e.g., images, photos, videos, animations, graphs, and other visual indicia such as spatially arranged indicators that represent real-world physical positioning), and action modules that prompt the user for input (e.g., numeric input, textual input, form input, visual input, user signature/sign-off, and the like). Visual indicia may be provided on any suitable digital display including, for example, a screen of a computing device, in a digital AR/VR/XR environment, on a heads-up display, or the like. Form inputs may include freeform text input, selections of multiple choice options, checkbox selections, and the like. Visual input may include one or more photos of the target of the digital guided workflow.

Photo input may be provided (e.g., uploaded) as evidence of the state of the system both before and after completing the step of the procedure. In this way, the photo input may be used to verify the target of the procedure is in a desired state before beginning the step of the procedure and that the target is in a desired state after completing the step of the procedure. AISV as described herein may be utilized to verify that the state of the target is in the desired state. For example, AISV may inform the user (e.g., an employee) that the target is in the appropriate state for beginning the next step of the procedure or may inform the user of what modifications to the target are needed before beginning the next step of the procedure. As another example, AISV may inform a user (e.g., a supervisor) that the target of the procedure is in a desired state when confirming whether SOPs are being followed, when conducting diagnostics and maintenance, and the like. AISV may provide feedback regarding the state of the target in real-time (e.g., the current state of the target) or at a prior point in time (e.g., a past state of the target).

For convenience and without limitation, aspects of the disclosure will be provided in the context of an industrial manufacturing setting whereby a digital guided workflow guides a worker through a multi-step procedure for operating an industrial manufacturing system (e.g., a station of an assembly line deployed at a factory floor). To illustrate how AISV may facilitate operation of the industrial manufacturing system, the following hypothetical scenario may be considered whereby, before beginning a step of the digital guided workflow, the worker must confirm that three screws are appropriately set, five switches are appropriately flipped, and seven knobs are appropriately dialed. The desired state of the system at this stage of the digital guided workflow, therefore, may be defined by the state of the screws, switches, and knobs. The state of these objects may be referred to as aspects of the state of the system. More generally, aspects of a state of a target for AISV may include any observable quality of the target or its objects. Such aspects may include, for example, presence, absence, quantity, arrangement, positioning, orientation, spatial relationship, color, texture, shape, contour, fill level, connectedness, temperature, and the like. It should be appreciated that aspects of a target for AISV may include qualities of the target or its objects that are visible by the human eye as well as those that are not visible by the human eye but are detectable by imaging devices. Visually observable qualities thus may include those observable by humans or machine (e.g., visible light imaging, thermal imaging, infrared imaging, light detection and ranging (LIDAR), fluorescence imaging, x-ray imaging, satellite imaging, electron imaging, hyperspectral imaging, tomographic imaging, ultrasound imaging, and other types of electronic imaging). It should also be appreciated that the AISV process may be used to verify qualities of the target or its objects that are not detectable by an imaging device but are observable by the human eye. For example, an imaging device may not be able to observe the fill level of an opaque container. As such, the semantic textual description for the desired state of the target may indicate a desired fill level for that container (e.g., empty, full), and the AISV process may inform the user that the fill level of the container could not be verified and request that the use confirm the state of the fill level is the desired state of the fill level. A textual description of the state of the system in this hypothetical may semantically explain, using natural language, the requirements for the desired state of the system (e.g., that the three screws are tapped but not yet tightened, that the first and third switches are flipped off with the remaining switches flipped on, and that the knobs are all turned to a zero degree heading). An AISV workflow thus may perform an overall evaluation the state of a target as well as a more granular evaluation of the state of individual objects of the target (e.g., as granular as whether the target includes slotted screws or Phillips screws). The worker may obtain an image of the current state of the system and upload the image for AISV.

The ASIV process, therefore, may begin with a computing system or computing device receiving a digital image depicting the state of the system. The semantic textual description of the desired state of the system for the current step of the guided workflow may be obtained. For example, the digital guided workflow may be stored as a procedure in a data repository. The procedure may define multiple steps of the digital guided workflow. Each step of a digital guided workflow may include or otherwise be associated with a semantic textual description of the desired state of the system. A step of a digital guided workflow may include or be associated with multiple semantic textual descriptions of the desired state of the system (e.g., a semantic textual description of the desired state of the system before beginning the step and a semantic textual description of the desired state of the system after completing the step). One or more grounded computer vision (CV) models may be used to generate annotations for the uploaded images (e.g., label and enumerate the objects detected in the image). A vision-language model (VLM) then may be used to generate a textual description of the uploaded image using the semantic textual description of the desired state of the system and the generated annotations. To generate the textual description of the uploaded image, the VLM may be prompted based on the semantic textual description and the desired annotations. The textual description of the uploaded image may semantically explain, using natural language, the state of the system and its objects as depicted in the uploaded image. In other words, the VLM may generate the textual description based on the prompt. The prompt may be, for example, a question about what is depicted in the uploaded image. Continuing the example above, respective prompts may ask the VLM how many screws are depicted in the uploaded image, which switches are flipped off, and whether the knobs are dialed to zero. In response to these prompts, the VLM may generate textual descriptions that indicate only two of the three screws were present, all of the switches were flipped off, and none of the knobs were dialed to zero. The textual description generated by the VLM in response to the prompts may be provided to a large language model (LLM) for evaluation of whether the state of the system is the desired state of the system. The LLM may be, for example, a reasoning-acting agent (sometimes referred to as a "ReAct" agent) configured to invoke some action based on its reasoning about the input it receives (e.g., the textual descriptions of the desired state of the system and the textual description of the uploaded image generated by the VLM). As described herein, such actions may include, for example, invoking the grounded CV models to generate additional annotations, prompting the VLM to generate additional textual descriptions for the image, providing a checklist of aspects for the user to manually verify, and providing a conclusion as to whether the state of the target is or is not the desired state. The LLM also may be configured with Chain-of-Thought (CoT) reasoning whereby the LLM generates text explaining how the LLM reached a conclusion. The text generated by the LLM explaining its reasoning may be referred to as the reasoning generated by the LLM.

Depending on the content of the textual descriptions generated by the VLM, the LLM may or may not be able to verify whether the state of the system is the desired state of the system. In other words, the LLM may evaluate the textual descriptions of the image to determine whether it can verify whether the state of the system is the desired state of the system (i.e., whether the state of the system is the desired state of the system is verifiable). Verifying the state of the system includes determining that the state of the system either is or is not the desired state of the system. Using the example above, examples of textual descriptions generated by the VLM that collectively may be sufficient to verify that the state of the system is the desired state may be: "detected three tapped screws," "detected five switches with the first and third switches flipped off and the second, fourth, and fifth switches flipped on," and "detected seven knobs turned to the zero setting" given that these descriptions correctly identify and enumerate the objects of the desired state of the system and indicates that the aspects of the identified objects match those specified in the semantic textual description of the desired state of the system. Examples of textual descriptions generated by the VLM that may be sufficient to verify that the state of the system is not the desired state of the system include: "detected three screws with the second and third screws tightened," "detected five switches all flipped off," and "detected seven knobs all dialed to various positions" given that these descriptions also correctly identify and enumerate the objects of the desired state of the system and indicates that the aspects of the identified objects do not match those specified in the semantic textual description of the desired state of the system.

If the LLM determines that it cannot verify whether state of the system is the desired state of the system based on a textual description generated by the VLM, then the LLM may iteratively invoke the grounded CV models and prompt the VLM as needed until the LLM can verify whether the state of the system is the desired state of the system. Subsequent iterations may leverage the reasoning generated by the LLM during a prior iteration when requesting additional annotations or creating the prompts for the VLM. As an example, the LLM may request the grounded CV models to annotate the screws in the image and prompt the VLM to confirm that screws are present in the image. If the VLM returns a response indicating that no screws are present in the image, then the LLM may request that the grounded CV models to annotate screw holes in the image and prompt the VLM to confirm the presence of screw holes in order to confirm that the screws are not present in the image. Each iteration, therefore, may include generating a prompt for the VLM based on reasoning generated by the LLM during a prior iteration and prompting the VLM to describe the uploaded image based on the prompt generated. During each iteration, reasoning generated by the LLM's chain-of-thought functionality (e.g., during the initial iteration or a previous iteration) may be provided as input to the LLM. Based on this additional reasoning received as input, the LLM may determine one or more deficiencies preventing the LLM from being able to verify whether the state of the system is the desired state of the system. When evaluating the uploaded image in the above scenario, the LLM may generate prompts for the VLM based on the semantic textual description of the desired state of the system in a piecemeal or stepwise fashion. Using the scenario above, for example, the LLM may iteratively generate and submit prompts to the VLM including: How many screws are in the image?"/"Are the screws tapped or tightened?"/"How many switches are in the image?"/"Which switches are flipped on and which switches are flipped off?"/"How many knobs are in the image?"/"Are all the knobs dialed to zero?"/"Which knobs are not dialed to zero?"/etc. By prompting the VLM in this fashion and including the reasoning generated during a prior iteration, the LLM may obtain enough information about what the uploaded image depicts in order to render a determination of whether the state of the system is the desired state of the system.

The LLM may leverage the CoT reasoning it generates at each iteration and fed back into the LLM as input during a subsequent iteration. For example, the LLM may generate CoT reasoning that divides the task of evaluating whether the state of the system depicted in the uploaded image is the desired state into discrete steps including: "Determine what objects are relevant for the desired state."/"Determine what state is desired for each relevant object."/"Determine the presence of the relevant objects in the uploaded image."/ "Determine that the relevant objects are in the desired state."/"Determine whether the uploaded image depicts screws."/"Determine whether the uploaded image depicts switches."/"Determine whether the uploaded image depicts knobs." Based on this reasoning and during an initial iteration the LLM may analyze the semantic textual description of the desired state of the system to request the relevant annotations to the image generate an initial set of prompts for the VLM that are configured to assess whether the uploaded image of the system depicts the objects referenced in the semantic textual description of the desired state, including for example: "Does the image depict screws?"/ "Does the image depict switches?"/"Does the image depict knobs?" Based on the output of the VLM, during subsequent iterations, the LLM may receive as input the discrete steps identified during the previous iteration and generate additional annotation requests for the grounds CV models and additional sets of prompts for the VLM as needed that are configured to assess whether the uploaded image depicts the objects in their desired state, including for example: "How many screws are there?"/"How many switches are there?"/ "How many knobs are there?" and "Are the screws tapped or tightened?"/"Which switches are flipped on?"/"Are the knobs all dialed to zero?"

It will be appreciated that, depending on what is depicted in the uploaded image, the LLM may or may not be able to verify that the state of the system is the desired state of the system. For example, the VLM may not be able to detect the presence of one or more of the objects referenced in the semantic textual description of the desired state of the system. For example, the LLM may prompt a grounded CV model to identify additional objects based on the reasoning generated by the LLM during a prior iteration (e.g., to identify or better identify one or more objects that could not be sufficiently detected or analyzed during a prior iteration). The LLM may be configured to invoke the grounded CV models during a subsequent iteration in order to identify additional objects in the image that may be helpful in evaluating whether the state of the system is the desired state described in the semantic textual description. In other scenarios, the LLM may be able to verify (e.g., with a threshold confidence) that the state of the target system is or is not the desired state. The LLM may iteratively evaluate the state of the system depicted in the uploaded image by iteratively generating prompts for the VLM in this fashion until the LLM determines that whether the state of the system is the desired state of the system is verifiable.

If the LLM determines that it can verify whether the state of the system is the desired state, then the LLM may generate a corresponding result (e.g., "DONE" to indicate that the state of the system is the desired state or "NOT DONE" to indicate that the state of the system is not the desired state). The result generated by the LLM may then be output to a user (e.g., presented on a display screen or view of a computing device being operated by the user during a digital guide workflow).

This iterative approach thus leverages the reasoning generated by the LLM to obtain textual descriptions from the VLM that are sufficient to verify whether the state of the system is the desired state. By providing the LLM's reasoning from a prior iteration as input to the current iteration, the LLM may determine what portions of the semantic textual description of the desired state require further analysis using the grounded CV models and VLM. As described in further detail below, in the event the LLM concludes that the state of the system is not the desired state of the system, the LLM may inform the user what aspects of the system need to be modified to transition the system from its current state to the desired state. Using the above example, the LLM may generate a result indicating that the state of the system is not the desired state because only two screws were detected instead of three, all switches were flipped off, and some of the knobs were not dialed to zero. Based on receiving this feedback, the user may tap the third screen, flip the appropriate switches to on, and dial the relevant knobs to zero. The user may then repeat the AISV process to confirm that the new state of the system is the desired state. The photo of the system in its desired state may then be uploaded or stored in a data store with an indication that the desired state of the system has been confirmed (e.g., for a supervisor's or administrator's review, for compliance checking, or for logging purposes). As also described in further detail below, in the event the LLM concludes (e.g., after a threshold quantity of iterations) that the textual description generated by the VLM is not sufficient to verify whether the state of the system is the desired state, the LLM may inform the user what aspects of the system could be confirmed and what aspects of the system could not be confirmed. Using the above example, the LLM may generate a result indicating that the state of the system could not be verified as the desired state because, although the screws, switches, and knobs could all be detected in the uploaded image, their respective configurations could not be verified (e.g., perhaps due to the quality of the image). The AISV process may allow the user to manually verify what the LLM could not or allow the user to upload a new (e.g., perhaps better quality image) to retry the AISV process for the current step of the digital guided workflow.

It will be appreciated that, in some scenarios, the AISV process may not need to iteratively evaluate the state of the system in order to verify whether the state of a system is a desired state of a system. For example, a single run through the AISV process may be sufficient to determine whether the state of the system is the desired state. It will thus also be appreciated that the disclosures herein include within their scope an AISV workflow (or pipeline) whereby a digital image depicting a state of a system is received; a semantic textual description of the desired state of the system is obtained; one or more annotations for the digital image are generated using one or more grounded CV models; a textual description of the digital image is generated using a VLM based on the digital image and the one or more annotations; an LLM configured with chain-of-thought reasoning determines that the textual description generated by the VLM is sufficient to verify whether the state of the system is the desired state; the LLM verifies whether the state of the system is the desired state using the textual description of the digital image generated by the VLM; and an indication of whether the state of the system is the desired state may be provided to a user. Furthermore, additional and alternative examples, scenarios, use cases, applications, and the like will be appreciated with the benefit of this disclosure.

Turning now to FIG. 1, a block diagram of an example computing environment 100 for AI state verification is shown. The computing environment 100, in this example, includes a computing device 102 in signal communication with an application server 104 via one or more networks 106. Although only a single computing device 102 and a single application server 104 are illustrated in FIG. 1, other example implementations of the computing environment may include multiple computing devices and multiple application servers. For example, functionality of the application server 104 may be deployed in a distributed fashion across multiple application servers of a computing system.

The computing device 102 may include an application 108 and a camera 110. The computing device 102 may be a mobile computing device (e.g., a smartphone, tablet computer), a laptop computer, a desktop computer, wearable computing devices (e.g., a wearable headset, "smart" glasses), and the like. The camera 110 may be integrated into the computer 102 or attached to the computer as a peripheral device. The camera 110 may be configured for one or more types of imaging as described herein. During operation the camera may capture an image of a target 112 for an AISV process. As described above, the target 112 may be a system such as an industrial manufacturing system. It should be appreciated, however, that the target may be anything suitable for analysis using grounded CV models and VLMs. As such, other examples of the target 112 include other types of systems, devices, objects, settings, arrangements, displays, screenshots, collections, combinations, diagrams, individuals (e.g., workers), and the like. The application 108 may be configured to initiate an AISV process. The application 108 may be configured to provide digital guided workflows to a user of the computing device 102 and configured to initiate the AISV process as an optional or required step of the digital guided workflow. For example, the user may initiate an AISV process to provide evidence that a step of the digital guided workflow was complete correctly. The application 108 thus may be configured with an "evidence upload" feature in order to provide the result of the AISV process along with the image of the state of the system that was verified. In some examples, the application 108 may be configured to initiate an AISV process on-demand based on the user selecting the AISV feature. In some examples, the application 102 may be a stand-alone application configured to provide the AISV functionality with the digital guided workflows being provided by a separate application installed at the computing device 102. In some examples, the AISV functionality may be provided remotely (e.g., "in the cloud"), for example, as a web application. The computing device 102, therefore, may access the AISV functionality via a web browser in some examples.

The application server 104, in this example, includes an LLM in the form of a reasoning-acting ("ReAct") agent 114, one or more grounded CV models 116, and a vision-language model 118. In some examples, the application server 104 optionally may include additional components to provide additional functionality for AISV processes. As indicated by way of the dashed lines in FIG. 1, the application server 104 optionally may include a video processor 120, a data store 122 storing memory data associated with the reasoning-acting agent 114, and one or more LLMs 124.

The reasoning-acting agent 114, in this example, is an LLM configured with chain-of-thought reasoning. The CoT configuration causes the reasoning-acting agent 114 to generate human-readable text indicating the reasoning ("thoughts") generated by the reasoning-acting agent that leads it to its final conclusion. The final conclusion may include, for example, an indication of whether the state of the target 112 is the desired state of the target (e.g., "DONE" or "NOT DONE"), an indication of whether the state of the target is the desired state is verifiable based on the current information available, or whether the state of the target is the desired state cannot be verified. As described herein, the final conclusion may also include an indication (e.g., one or more lists) of aspects of the target that could or could not be verified for presentation to the user. The final conclusion also may include a determination to invoke one or more of the AI tools used to evaluate the state of the target during a subsequent iteration in order to obtain additional information regarding the state of the target, for example the one or more of the grounded CV models 116, the VLM 118, or both.

The reasoning-acting agent 114, in this example, is configured to accept as input the image of the target captured and uploaded by the computing device 102, the semantic textual description of the desired state of the target, and reasoning generated by the reasoning-acting agent, for example during a prior iteration. When the AISV process is first initiated, the reasoning-acting agent 114 initially may receive the uploaded image and the semantic textual description of the desired state. During subsequent iterations, the reasoning-acting agent 114 may also receive as input the reasoning generated during the initial evaluation or a prior iteration. In this way, the reasoning-acting agent 114 may learn from each iteration and take any actions needed to acquire additional information used to determine whether it can verify that the state of the target is the desired state and, if verifiable, whether the state of the target is the desired state. This iterative approach thus provides a feedback loop where the reasoning-acting agent 114 uses its own reasoning to adjust its actions in real-time in order to evaluate the state of the target and appropriately inform the user. For example, based on its evaluation of the state of the target depicted in the image, the reasoning-acting agent 114 may generate prompts for the grounded CV models 116 (e.g., additional descriptions of objects (e.g., noun phrases) to detect in the uploaded image, questions for the VLM regarding what is depicted in the uploaded image) that are evaluated during subsequent iterations.

The grounded CV models 116, in this example, are configured for object detection. The grounded CV models 116 thus may include an object detection model pretrained with language-image pairs and noun phrases. A noun phrase includes a noun (e.g., "screw") with an optional descriptor (e.g., "largest screw"). The object detection may be configured to generate, for each detected object, a confidence value. As part of the object detection process, the object detection model may remove any detections that do not satisfy a desired confidence threshold. Example object detection models include DINO (DETR (Detection Transformer) with Improved Denoising Anchor Boxes), which may be trained with a vision language model such as CLIP (Contrastive Language-Image Pretraining). The grounded CV models 116 also may include an object segmentation model configured to segment the uploaded image based on the detected objects. For example, the object segmentation model may be configured to identify what portions (e.g., which pixels) of the uploaded image correspond to the detected objects and uses a suitable language to reference the detected objects in the uploaded image. The object segmentation model thus may be configured to generate or otherwise obtain, for each detected object, a mask (e.g., of pixels) corresponding to the portion of the image that includes the detected object. In some implementations, the mask may be expanded (e.g., by x pixels) to ensure the mask encompasses the entirety of the detected object. Using a mask to segment each detected object may be preferable over other options to segment the image (e.g., a bounding box). By using a mask corresponding to the shape of the detected object, the VLM may be able to more reliably describe the shape of the detected objects when generating the textual description of the uploaded image. Example object segmentation models include the Segment Anything Model (SAM), which likewise may be trained with CLIP. In some examples, one or more CV models may be employed to estimate the relative rotational orientation of objects depicted in the image.

In some implementations, the grounded CV models 116 may be configured to label and enumerate the detected objects. For example, an image depicting three screws may annotated with the text label "screw" for each detected screw, and each detected screw may be annotated with its respective enumeration (e.g., numeric label "1" or "2" or "3"). In some implementations, the numeric labels indicating the enumerations may be located at the center of the detected objects and the noun phrase determined for the object may be located at a boundary (e.g., the top boundary) of a bounding box that encompasses the object. The reasoning-acting agent 114 and the VLM 118 may utilize the annotations in order to reference the detected objects in the image, for example, when the reasoning-acting agent generates prompts for the VLM to answer regarding what is depicted in the uploaded image (e.g., "is the Screw 3 tightened?" and "is Knob 7 dialed to zero?") and when the VLM generates the text description of the uploaded images based on the prompts from the reasoning-acting agent (e.g., "Screw 3 is not tightened" and "Knob 7 is dialed to zero"). In some implementations, the annotations may be implemented as tokens that pair the noun phrase of the object with the enumeration of the object (e.g., token: {screw, 3}, token: {largest knob, 7}). The tokens may then be provided to the reasoning-acting agent 114 and the VLM 118 to reference during an AISV process. In some example implementations, the annotations generated by the grounded CV models 116 may be embedded in or otherwise included in the image of the target 112. For example, the grounded CV models 116 may be configured to modify the image data of the uploaded image to include new image data corresponding to the shape data for the detected objects and the labels with the noun phrases and enumerations. As another example, the grounded CV models 116 may create an entirely new image based on the uploaded image with the new image including image data corresponding to the shape data, the noun phrases, and the enumerations. In some implementations, the annotations may be provided in a separate data structure that is stored with an association to the uploaded image.

The VLM 118 is configured to generate a textual description of the image based on prompts requesting information about the image. The reasoning-acting agent 114 may generate the prompts for the VLM 118 based on the semantic textual description of the desired state of the target 112. The VLM 118, therefore, is configured to receive as input the image of the target 112, the annotations for the image, and a prompt requesting information about the image. The VLM 118 is also configured to generate as output a textual description of the image based on this input and provide the textual description back to the reasoning-acting agent 114. As described herein, the reasoning-acting agent 114 may prompt the VLM 118 multiple times during an AISV process in order to determine whether the state of the target 112 can be verified as the desired state based on the uploaded image and, if verifiable, determine whether the state of the target is or is not the desired state. An example of a VLM is Gemini 2.0 developed by Google.

In some implementations, rather than upload an image of the target 112, the computing device 102 may upload video of the target 112. In these implementations, the application server 104 may include a video processor 120 configured to process the video for an AISV process. For example, the video processor 120 may be configured to split the video of the target 112 into individual image frames. One or more of the images frames (e.g., each image frame) may be provided to the grounded CV models 116 for object detection, object segmentation, and annotation as described herein. The segmented and annotated image frames then may be provided to the VLM 118 for evaluation as described herein. In some implementations, the video processor 120 may be configured to combine segmented and annotated image frames back into a video (e.g., the full video or a video snippet), and the video may be provided to the VLM 118 for evaluation. Although the video processor 120, in this example, is shown as being a component of the application server 104, in other implementations, the video processor may be a remote third-party service that the application server accesses via the networks 106.

In some implementations, the application server 104 may include an agent memory data store 122 that stores the reasoning generated by the reasoning-acting agent 114 during an AISV process. For example, the reasoning-acting agent 114 may stream the generated reasoning to the data store for storage during the AISV process. The agent memory data store 122 may be configured with a database to store the generated reasoning. Any suitable database technology may be used to store the generated reasoning. The agent memory data store 122 may be configured to persistently store the generated reasoning until receiving a user command to delete it. The agent memory data store 122 additionally or alternatively may be configured to temporarily store the generated reasoning, for example, until an AISV process completes or until the data store is full and overwritten by reasoning generated by a subsequent AISV process (e.g., in a first-in-first-out manner). The reasoning stored in the agent memory data store 122 may be retrieved (e.g., queried), summarized, and presented to the user, for example, in real-time during an AISV process or in response to a specific request for the summary from the application 108 at the computing device 102. The summary of the generated reasoning may help the user understand as the AISV process progresses what aspects of the target 112 match and do not match the desired state of the target or what aspects of the desired state of the target can or cannot be verified from the image provided.

In some implementations, the application server 104 may include one or more additional large language models 124 to facilitate or enhance aspects of the AISV process. For example, as described herein, an ASIV process may generate a checklist of aspects of the target 112 that could and could not be verified with respect to the desired state of the target. The reasoning-acting agent 114 may use an LLM 124 to generate that checklist. As also described herein, a "test run" of an AISV process may be performed to help draft the semantic textual description of the desired state of the system. During the "test run," the user may be presented with questions for the user that may be designed to acquire additional details regarding the desired state of the target 112, clear up ambiguities identified in an image depicting the desired state of the target, and the like. The reasoning-acting agent 114 may use an LLM 124 to generate the questions presented to the user during the "test run." For example, the LLM 124 may receive as input reasoning generated by the reasoning-acting agent 114 as well as a prompt to generate questions about the desired state of the target 112 based on the reasoning. In some examples, the LLM 124 may be configured or prompted to generate a predefined quantity of questions (e.g., x questions). In some implementations, between 1 and 10 questions (e.g., 5 questions) may be sufficient to draft or refine a suitable semantic textual description of the desired state of the target. As another example, an LLM 124 may be used to summarize the reasoning stored in the agent-memory data store 122.

Although not shown in FIG. 1, it will be appreciated that the application server 104 may include additional components used to facilitate an AISV process. For example, the application server 104 may include logic (e.g., instructions, applications, programs, software, services, and the like) for receiving an AISV request from the computing device 102, receiving an image depicting the state of the target 112, and invoking the reasoning-acting agent 114 to initiate an AISV process. In a web-based implementation, for example, the application server 104 may include web server logic to receive web requests (e.g., HTTP requests) and provide web responses (e.g., HTTP responses) with application logic being used to initiate an AISV process based on a received web request. The application server 104 also may include a data store that stores the definitions for digital guided workflows presented to the user via the application 108 at the mobile device 102, the semantic textual descriptions of the desired states of respective targets associated with steps of the digital guided workflows, and the like.

The networks 106 may include one or more wired or wireless networks. For example, the networks 106 may include a wired local area network (LAN), a wireless LAN, a cellular network, a short-range network (e.g., a Bluetooth network), a mesh network, a wide area network (WAN) such as the global Internet, and the like.

Referring now to FIG. 2, a flowchart 200 of example method steps of an AISV process is shown. As described herein, an image of a target may be acquired (step 202). As described herein, the image may be acquired via an upload from a computing device. A textual description of the desired state of the target may be obtained (step 204). As described herein, the textual description of the state of the target may be stored at a data store, and the data store may be accessed (e.g., queried) to retrieve the textual description. The image may be annotated using one or more grounded CV models (step 206). As described herein, one or more annotations may be generated for the image (e.g., a noun phrase of a detected object paired with an enumeration of the detected object). A reasoning-acting agent may prompt the VLM (e.g., with one or more prompts) based on the textual description of the desired state of the target (step 208). The reasoning-acting agent may analyze the output of the VLM (step 210) to determine a conclusion about the state of the system (step 212). As described herein, determining a conclusion about the state of the target may include determining whether the state of the target is the desired state can be verified based on the image acquired and the current information available (e.g., the current output of the VLM). As also described herein, determining a conclusion about the state of the target may include determining that the state of the target is the desired state or determining that the state of the target is not the desired state. If the reasoning-acting agent does not determine a conclusion about the state of the target (step 212: No), then the reasoning-acting agent may require additional information about the state of the system depicted in the image acquired. To acquire the additional information needed to verify whether the state of the system is the desired state, the reasoning-acting agent may prompt one or more models (e.g., with one or more additional prompts) based on reasoning generated by the reasoning-acting agent (step 214). Prompting the one or more models may include prompting one or more of the grounded CV models to generate additional annotations for the image (e.g., to identify and segment additional objects depicted in the image). Prompting the one or more models may include prompting the VLM to provide additional textual descriptions about the image. The reasoning-acting agent may then analyze additional output of the VLM (step 215) to determine whether it can verify that the state of the target is or is not the desired state. As described herein, the reasoning-acting agent may perform as many iterations as needed and prompt the models as many times as needed to determine that it has sufficient information to render a conclusion about the state of the target. As such, the reasoning-acting agent may continue to prompt one or more models based on the reasoning generated by the reasoning-acting agent (step 214) and analyze the output generated by the VLM based on the additional prompts (step 215) until it reaches a conclusion about the state of the target (step 212: Yes). The reasoning-acting agent may then provide the conclusion and (optionally) the reasoning that led to that conclusion to the user (step 216). As described herein, the conclusion may be that the state of the target is the desired state of the target, that the state of the target is not the desired state of the target along with the reasons why, or that the state of the target could not be verified along with any aspects about the target that could be verified or any aspects about the target that could not be verified.

Figure 3:
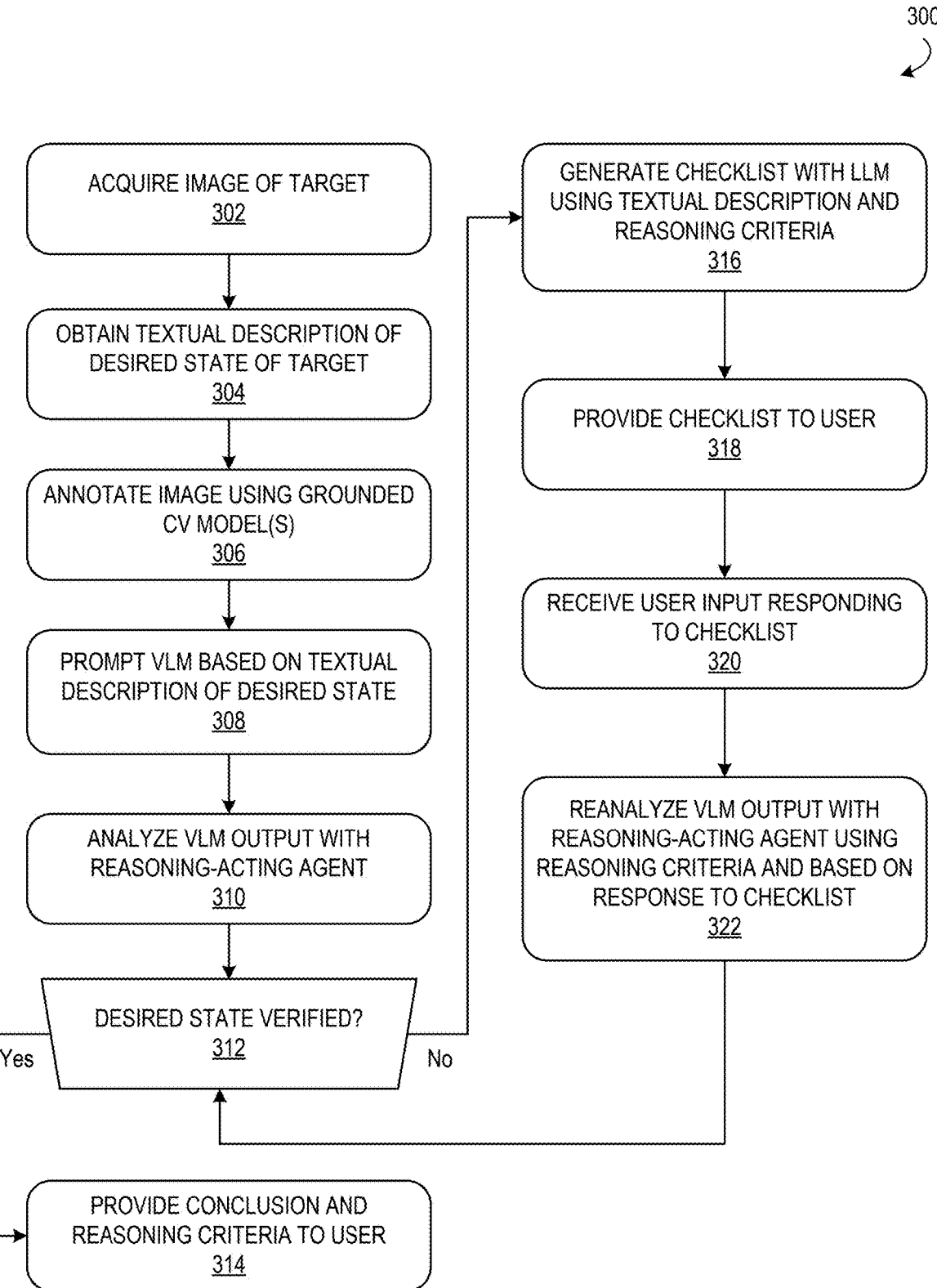
FIG. 3 shows another flowchart of example method steps of an AI state verification process.

In FIG. 3, a flowchart 300 of example method steps of an ASIV process is shown. The steps of the flowchart 300 in FIG. 3 illustrate a scenario whereby a reasoning-acting agent can verify whether the state of a target is the desired state of the target. Similar to the flowchart 200 discussed above with reference to FIG. 2, an image of a target may be acquired (step 302), a textual description of the desired state of the target may be obtained (step 304), the image may be annotated using one or more grounded CV models (step 306), the reasoning-acting agent may prompt the VLM (e.g., with one or more prompts) based on the textual description of the desired state of the target (step 308), and the reasoning-acting agent may analyze the output of the VLM (step 310). If whether the state of the target is the desired state of the target is verifiable, then the reasoning-acting agent may determine whether the desired state is verified (step 312) based on the results output by the VLM. If the reasoning-acting agent verifies that the state of the target is the desired state of the target (step 312: Yes), then the reasoning-acting agent may then provide the conclusion and (optionally) the reasoning that led to that conclusion to the user (step 316). If the reasoning-acting agent does not verify that the state of the target is the desired state of the target (step 312: No), then the reasoning-acting agent may generate a checklist with an LLM using the semantic textual description of the desired state of the target and the reasoning generated by the reasoning-acting agent that led it to conclude the state of the target is not the desired state (step 316). As described herein, the checklist may identify aspects of the target that could be verified as matching the desired state of the target as well as aspects that could not be verified as matching the desired state of the target. The reasoning-acting agent may provide the generated checklist to the user for review (step 318), for example by causing output of (e.g., presenting) the checklist at the computing device operated by the user. The reasoning-acting agent may then receive user input responding to the checklist (step 320). As described herein, the user input received may include a manual verification of the aspects of target that the reasoning-acting agent did not verify or could not verify as matching the desired state of the target. In this way, the user response to the checklist manual verification fallback or manual override of a conclusion reached by the reasoning-acting agent, which may be helpful in circumstances where the conclusions of the reasoning-acting agent include false positives or false negatives. As also described herein, the response to the checklist may include providing a new image of the target (e.g., a better quality image, an image from a different angle, an image from a different distance, and the like) and rerunning the AISV process using the new image. After receiving the user response to the checklist, the reasoning-acting agent may reanalyze output of the VLM using the generated reasoning criteria and based on the response to the checklist (step 322). As described herein, reanalyzing the VLM results thus may include generating one or more prompts for the VLM based on the reasoning generated by the reasoning-acting agent during a prior iteration. As also described herein, the reasoning-acting agent may invoke one or more AI tools to acquire additional information used to verify whether the state of the target is the desired state, for example, a grounded CV model or the VLM. The reasoning-acting agent may generate additional checklists and reanalyze the VLM results as many times as needed to determine whether the state of the target is the desired state of the target.

Figures 4A, 4B, 4C:
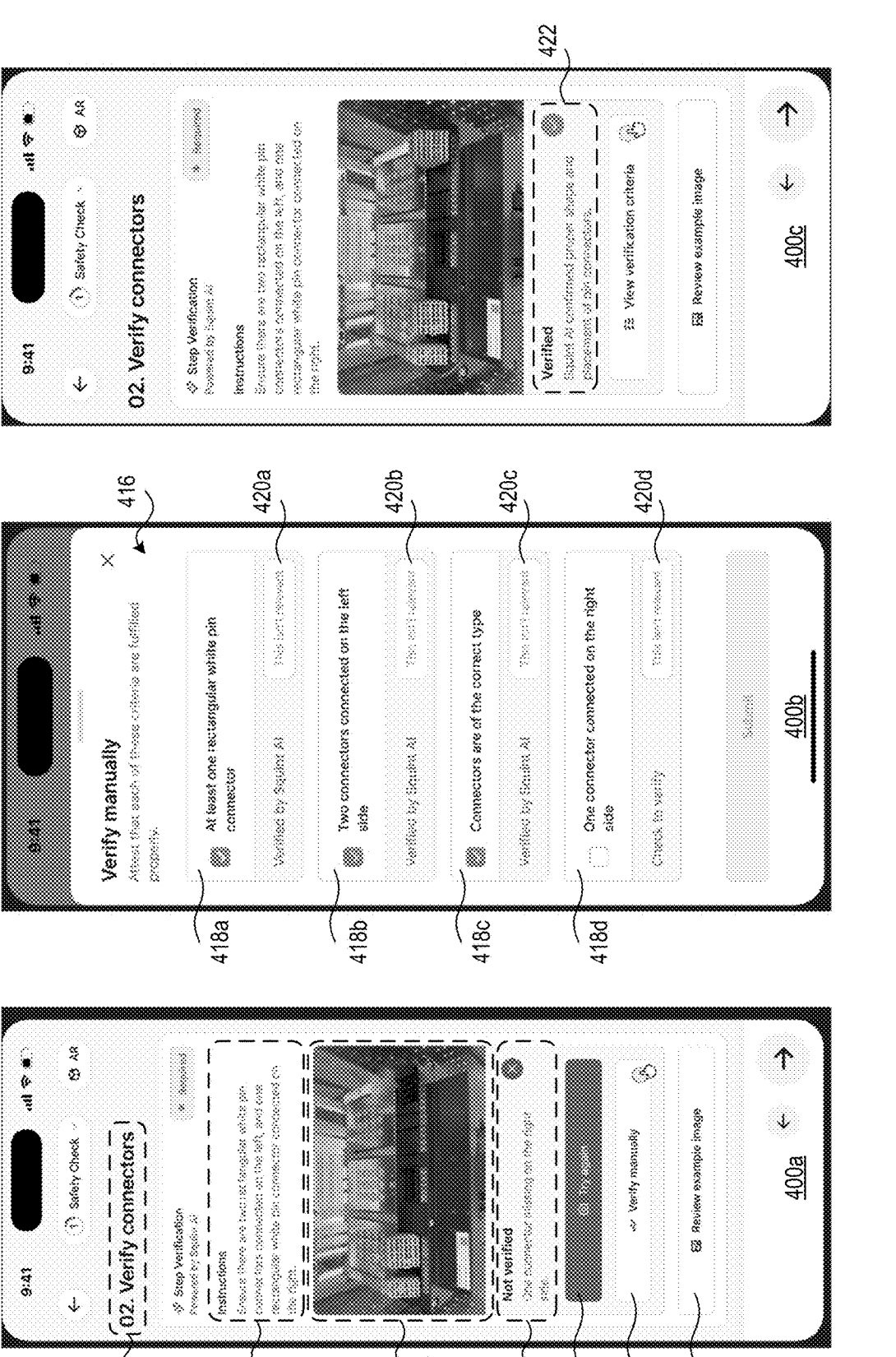
FIGS. 4A-C show a sequence of example screenshots from a mobile application configured to provide an AI state verification process as part of a digital guided workflow.

In FIGS. 4A-C, a sequence of example screenshots 400*a-c* from a mobile application configured to provide an AISV process as part of a digital guided workflow is shown. The screenshots 400*a-c* illustrate an example operation of a mobile application used to verify that the state of a target system for a step of the digital guided workflow is the desired state of the target system for that step.

In FIG. 4A, the screenshot 400*a* illustrates an example step 402 of a digital guided workflow that requires the user to verify connections on a target system. The screenshot 402*a* includes the semantic textual description 404 of the desired state of the target system, an image 406 of the current state of the target system, and the conclusion 408 generated by the AISV process indicating that the current state of the target system is not the desired state of the target system because one of the required connectors is missing. The screenshot 400*a*, in this example, also include certain options 410-414 that the user may select in response to the conclusion 408 that the target state of the system is not the desired state. Option 410 ("Try again"), in this example, may be selected to repeat the AISV process with a new image of the target system. Option 412 ("Verify manually"), in this example, may be selected to view a checklist of the aspects of the desired state of the target system and manually confirm the target system fulfills the criteria of the desired state. Option 414 ("Review example image") may be selected to view an image of the target system in the desired state (e.g., the image captured by a supervisor or administrator) when defining the desired state of the target system for the current step of the digital guided workflow.

In FIG. 4B, the screenshot 400*b* illustrates an example checklist 416 that may be presented to the user in response to the user selecting the option 412 ("Verify manually") shown in screenshot 400*a*. The checklist 416, in this example, includes multiple items 418*a-d* related to the desired state of the target system. Each item 418*a-d* includes a textual description of a certain aspect of the desired state of the system along with an indication as to whether or not the current state of the target system satisfies that aspect of the desired state. The indications, in this example, are presented in the form of user input elements, specifically checkboxes. In some implementations, the AISV process may precheck those aspects of the desired state of the target system that could be verified. In this example, the AISV process may be able to verify the aspects of the desired state for items 418*a-c* but not item 418*d* and thus precheck items 418*a-c* when presenting the checklist 416 to the user. The user may then manually verify the remaining item 418*d*, select its corresponding checkbox, and submit the completed checklist for verification. To account for circumstances where the criteria included in the checklist 416 might not be relevant for the desired state of the target system, the items 418*a-d*, in this example, each include respective options 420*a-d* that the user may select to indicate the identified criteria is not relevant, which may be considered when reevaluating the current state of the target system.

In FIG. 4C, the screenshot 400*c* illustrates the confirmation 422 that the current state of the target system is the desired state of the target system. With the target system being in the desired state, the user may proceed to the next step in the digital guided workflow. The user may then repeat the AISV process for the next step of the workflow. It will be appreciated, however, that some steps of a digital guided workflow may not require performing an AISV process.

In FIG. 5, a flowchart 500 of example method steps for creating the semantic textual description of a desired state of a target is shown. The steps of the flowchart 500 may be performed, for example, as part of a "test run" of an AISV process as described herein. A computing device and corresponding application such as that described above with reference to FIG. 2 may be used to perform the "test run" of the AISV process. The procedure to define a new desired state for a target first may be initiated (step 502), for example based on the user selecting an option at the application of the computing device to define a new AISV evaluation. A semantic textual description of the desired state of the target may be received (step 504), for example based on freeform text input provided by the user at the application of the computing device. An image of the target in the desired state may be acquired (step 506), for example via upload from the application at the computing device. The image of the target in its desired state may be referred to as a reference image, a baseline image, or a "ground truth" image. In some example implementations, the user may acquire and upload the image in real-time (e.g., using a camera of the computing device). In some example implementations, the image may be retrieved from a data store (e.g., a camera roll or image library at the computing device) based on being selected by the user. The image of the target in its desired state may be annotated using one or more grounded CV models (step 508) as described herein. A VLM may analyze the annotated image based on the semantic textual description of the desired state of the target (step 510) as described herein, for example based on prompts generated by a reasoning-acting agent requesting information about the objects depicted in the annotated image. The reasoning-acting agent may analyze the results generated by the VLM (step 512) in order to determine whether any additional details are needed (step 514), for example to refine the semantic textual description of the desired state of the target. If the reasoning-acting agent determines that no additional details are needed for the semantic textual description of the desired state (step 514: No), then the reasoning-acting agent may save the definition of the desired state of the target (step 516), for example to a data store. As described herein, the semantic textual description of the desired state may be saved with an association to a step of a digital guided workflow. If, however, the reasoning-acting agent determines that additional information is needed for the semantic textual description of the desired state (step 514: Yes), then the reasoning-acting agent may generate one or more clarifying questions using an LLM with the reasoning criteria generated by the reasoning-acting agent (step 518). The reasoning-acting agent may provide the clarifying questions to the user (step

520), for example by causing output of the clarifying questions at the application of the computing device. The reasoning-acting agent may then receive answers to the clarifying questions from the user (step 522), for example based on user input received at the application at the computing device. The user may provide input in response to the questions via a variety of input elements including freeform text input or selections of one or more options of selection input (e.g., checkboxes, radio buttons, dropdown menus, sliders, and the like). After receiving the answers to the clarifying questions, the reasoning-acting agent may analyze the answers received from the user (step 524) and again determine whether any additional details are needed (step 514). The reasoning-acting agent may generate additional clarifying questions and analyze the answers as many times as needed to refine the semantic textual description of the desired state of the target. By iteratively analyzing the answers to clarifying questions regarding the reference image and refining the semantic textual description of the desired state of the target, the accuracy of the AISV process may be improved.

In FIGS. 6A-I, a sequence of example screenshots 600*a-i* from a mobile application configured to perform a "test run" of an AISV process is shown. The screenshots 600*a-i* illustrate an example operation of a mobile application used to define the semantic textual description of the desired state of a target for the AISV process.

Figure 6C:
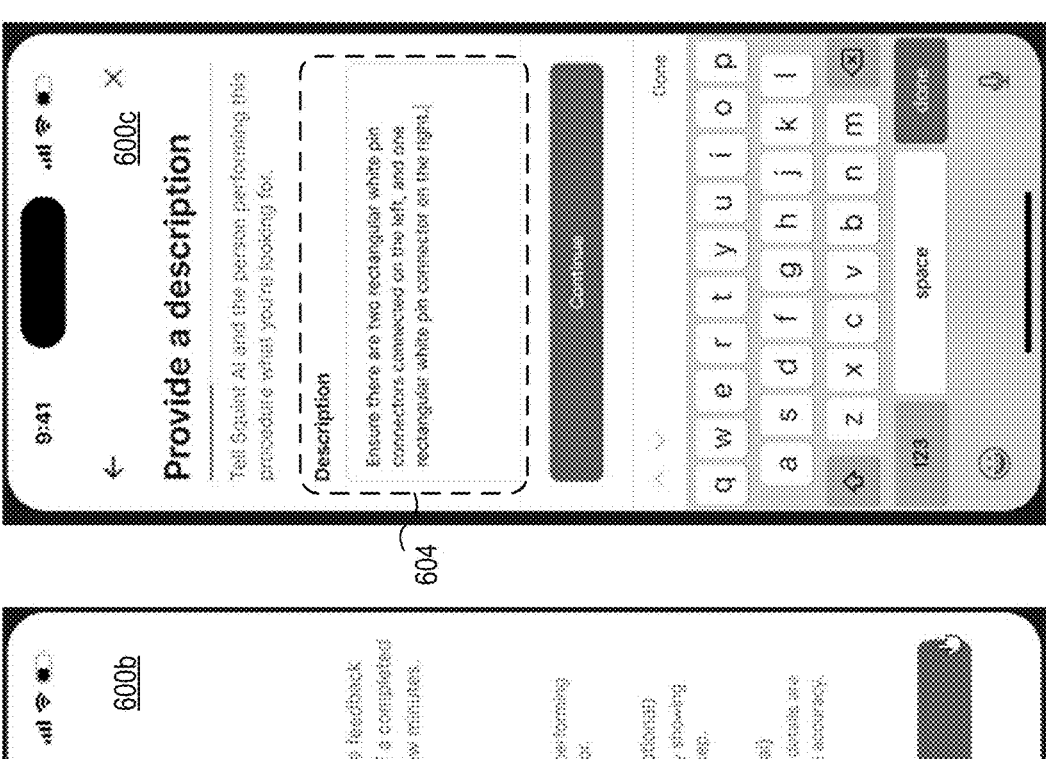
FIGS. 6A-I show a sequence of example screenshots from a mobile application configured to perform a "test run" of an AI state verification process.
Figure 6B:
Figure 6A:
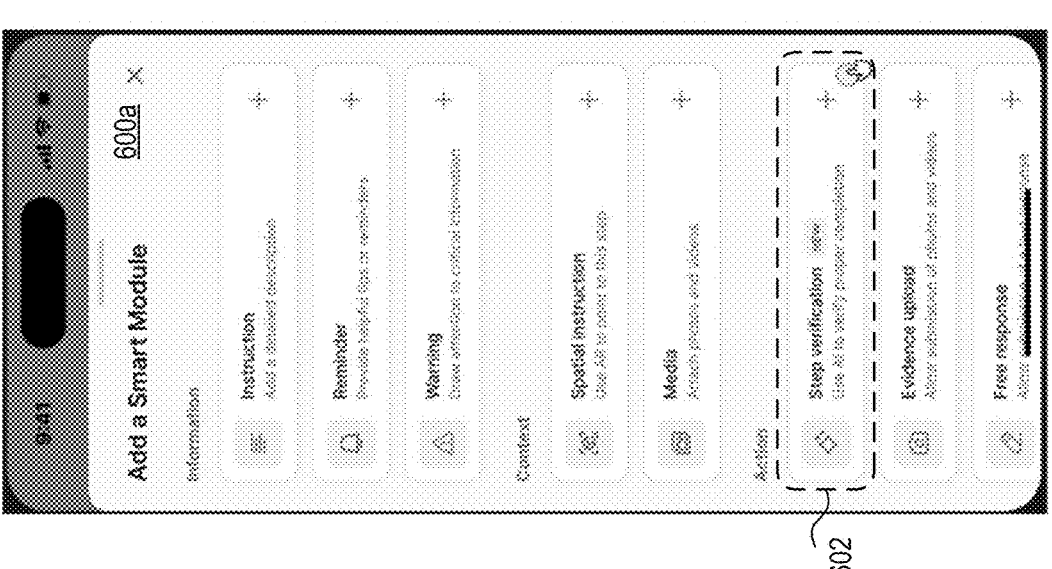
Figures 6D, 6E, 6F:
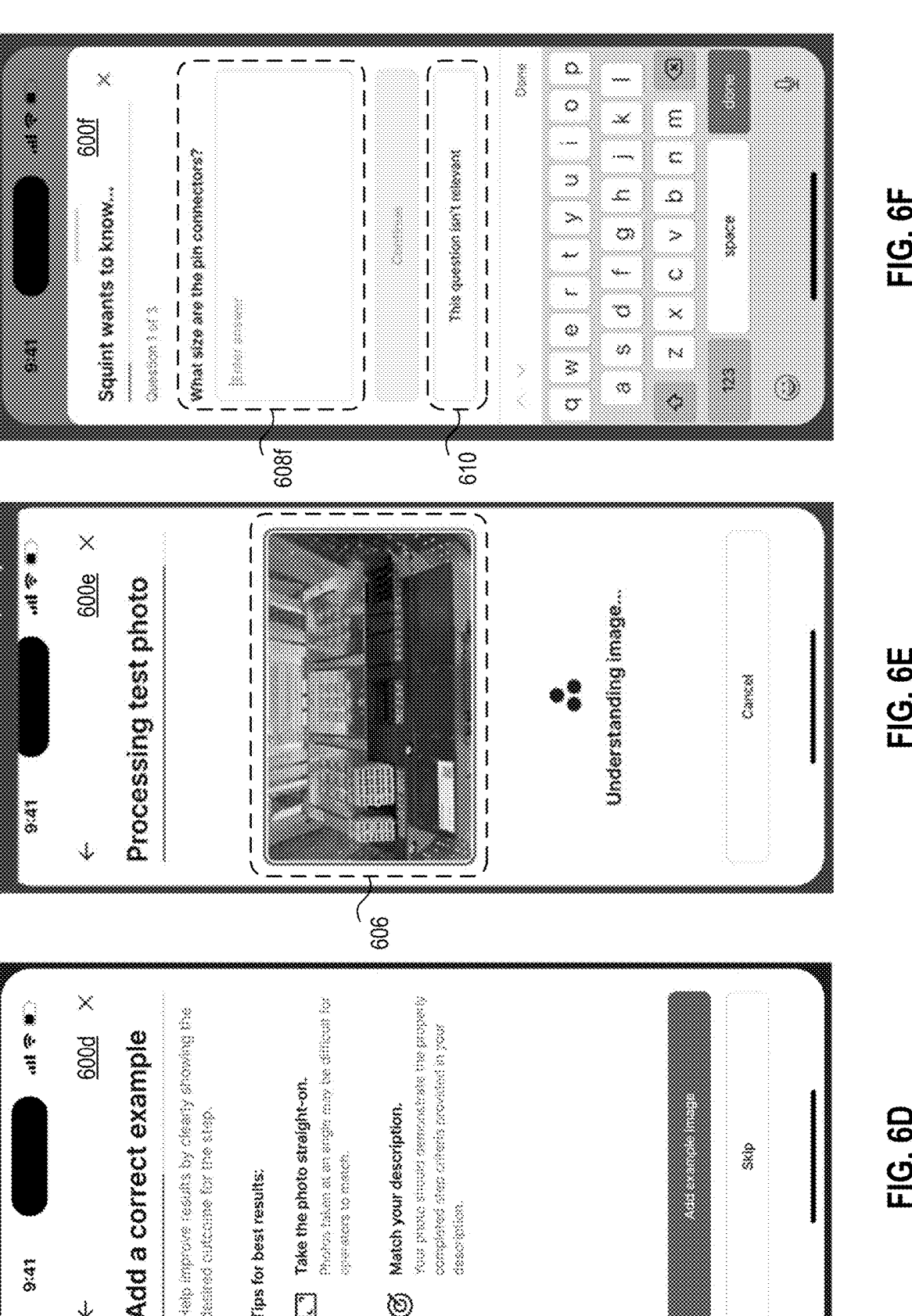
Figure 6I:
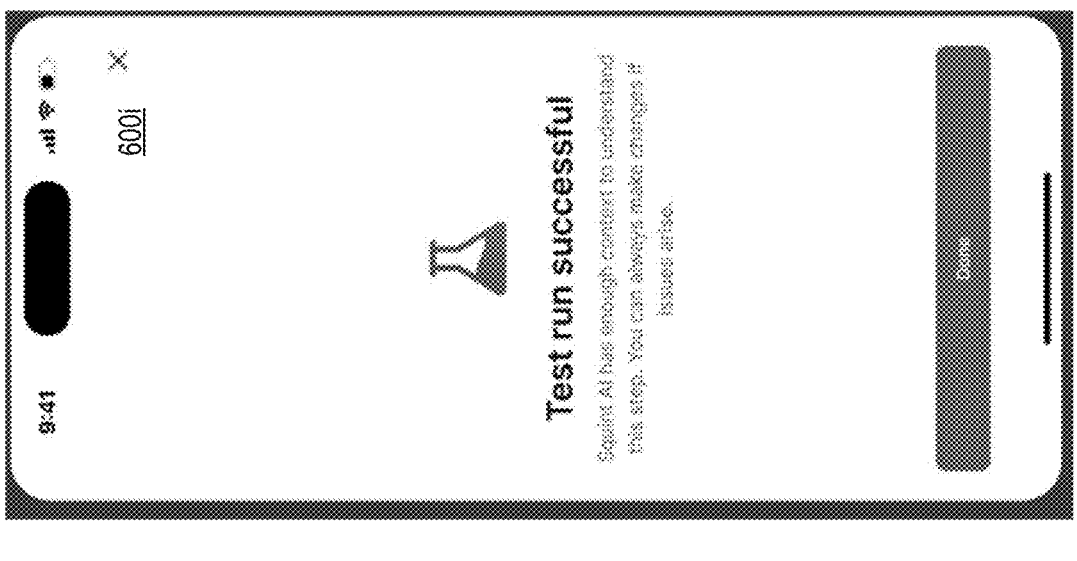
Figure 6H:
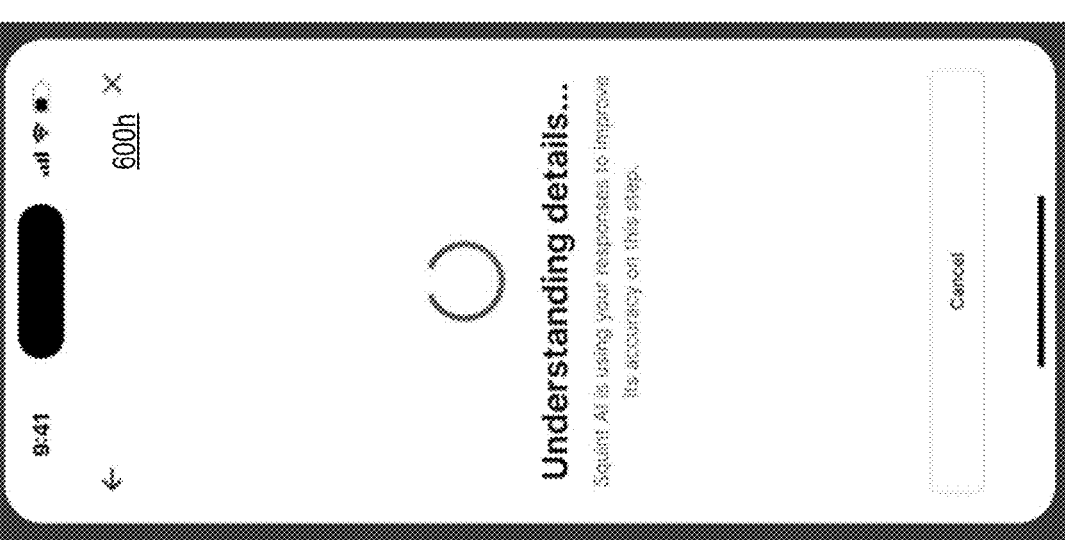
Figure 6G:
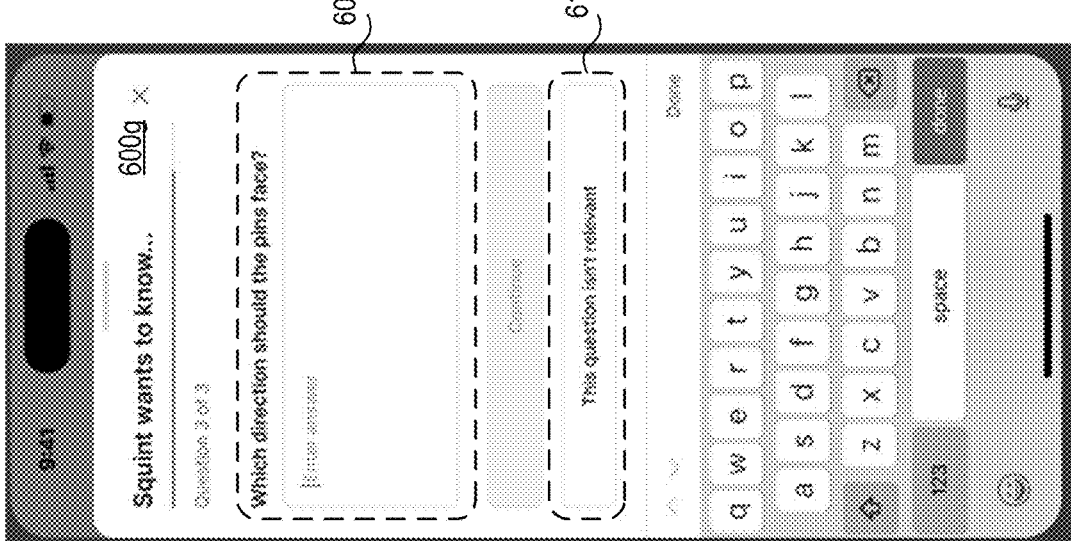

In FIG. 6A, the screenshot 600*a* illustrates a set of example options provided by an example mobile application configured to present digital guided workflows. The options include an option 602 ("Step verification") to define an AISV evaluation. In FIG. 6B, the screenshot 600*b* presents instructions for defining an AISV evaluation, which includes providing a semantic textual description of the desired state of a target, adding a reference image of the target in its desired state, and performing a "test run" of the AISV process to determine whether additional details are needed for the semantic textual description of the desired state in order to improve the accuracy of the AISV process. In some implementations, providing a reference image and performing a test run may be optional. In FIG. 6C, the screenshot 600*c* includes a freeform text input 604 for providing the semantic textual description of the desired state of the target. As described herein, the mobile application may facilitate refining the semantic textual description of the desired state by performing a "test run" of the AISV process and determining whether any additional details are needed. In FIG. 6D, the screenshot 600*d* presents instructions for capturing a reference image showing the target in its desired state. In FIG. 6E, the screenshot 600*e* displays the reference image 606 of the target in its desired state that is processed using the reasoning-acting agent, grounded CV models, and VLM as described herein. In FIG. 6F and FIG. 6G, the screenshots 600*f* and 600*g* include respective user input elements 608*f* and 608*g* in the form of freeform text input for providing answers to questions about the desired state of the target generated during the "test run" of the AISV process. The screenshots 600*f* and 600*g* also include selectable options 610 that may be used to indicate a question generated during the "test run" is not relevant for the semantic textual description of the desired state of the target. In FIG. 6H, the screenshot 600*h* indicates that the answers to the clarifying questions are being evaluated to determine whether the semantic textual description provides sufficient detail to determine whether a state of a target is the desired state of the target. In FIG. 6I, the screenshot 600*i* indicates that the "test run" of the AISV process has been completed success-fully with sufficient details being acquired.

Figure 7:
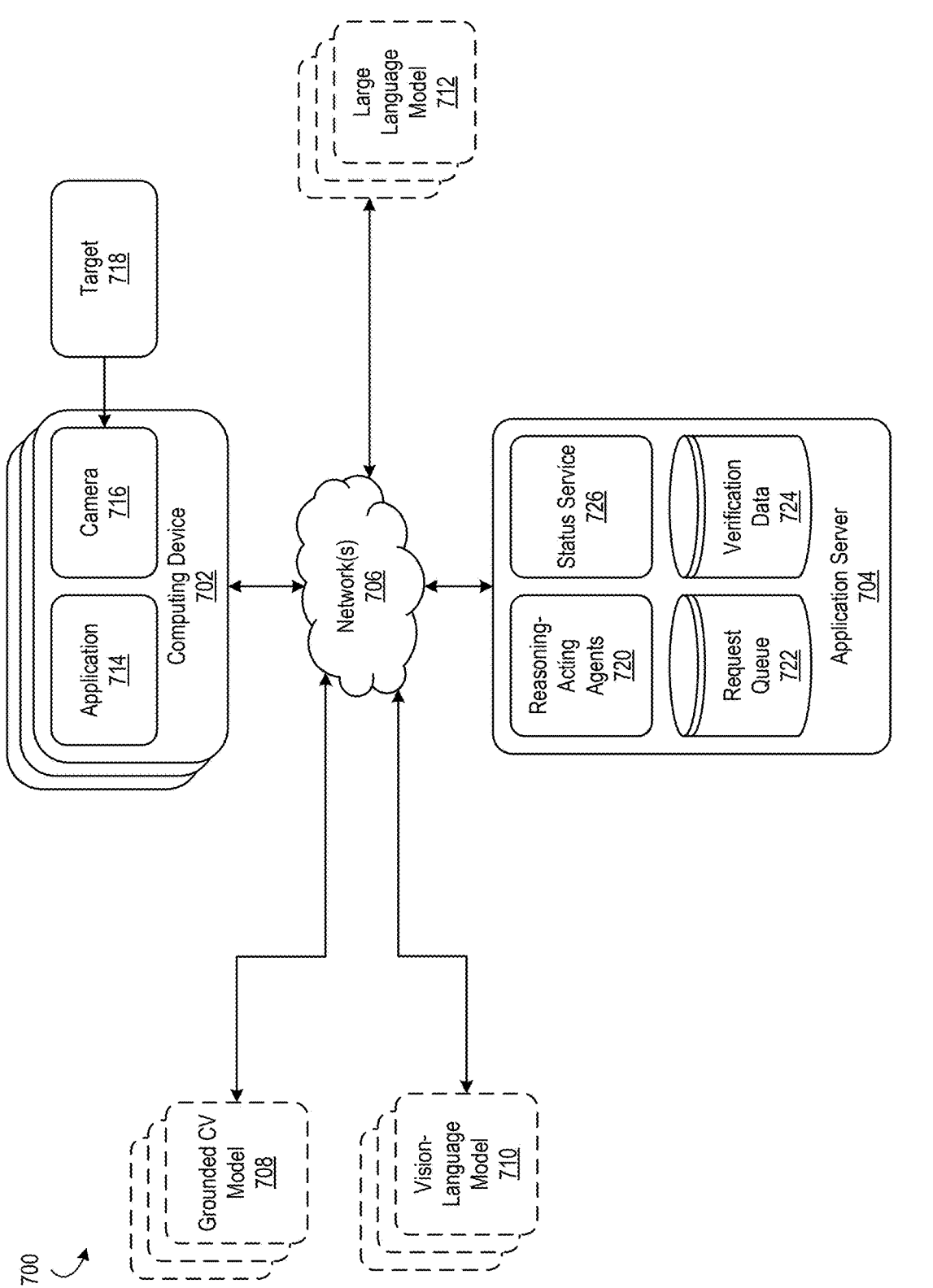
FIG. 7 shows a block diagram of another example computing environment for AI state verification.

In FIG. 7, a block diagram of another example computing environment 700 for AISV is shown. The computing environment 700, in this example, includes a "cloud"-based implementation of the disclosures herein whereby multiple computing devices 702 is in signal communication with an application server 704 via one or more networks 706 and whereby the application server is in signal communication with one or more remotely-located grounded CV models 708, one or more VLMs 710, and one or more LLMs 712 via the one or more networks. The grounded CV models 708, VLMs 710, and LLMs 712 thus may be hosted at one or more remote "cloud" architectures. The grounded CV models 708, VLMs 710, and LLMs 712 may provide function-ality that is the same as or similar to that of the grounded CV models 116, the VLM 118, and the LLMs 124 discussed above with reference to FIG. 1. The "cloud"-based imple-mentation shown in FIG. 7 may be helpful in a scenario whereby multiple computing devices submit requests for state verification.

The computing device 702 may be the same as or similar to the computing device 102 discussed above with reference to FIG. 2. For example, the computing device 702, in this example, likewise includes an application 714 and a camera 716 used to capture an image of a target 718.

The application server 704, in this example, is configured to queue state verification requests received from the com-puting devices 702 and manage performing AISV evalua-tions for the queued requests in an efficient manner (e.g., in a first-in-first-out manner, based on priority, and the like). The application server 704, in this example, thus includes multiple reasoning-acting agents 720 (which also may be referred to as reasoning-acting works in the context of a "cloud"-based implementation), an AISV request queue 722, a data store 724 storing data associated with the AISV processes, and a status service 726. By providing multiple reasoning-acting agents 720, the application server 704 may efficiently process AISV requests using parallel processing techniques.

A computing device 702 may provide an AISV request to the application server 704. Upon receipt of the AISV request, the application server 704 may add it to the AISV request queue. The AISV request may include, for example, the image of the target and an indication of the step associated with the semantic description of the desired state of the target (e.g., a unique identifier assigned to the step). To facilitate processing AISV requests from multiple com-puting devices, each AISV request may be assigned a unique identifier (e.g., a job ID) and the image received in the AISV request may be assigned a unique identifier.

When the AISV request queue 722 includes pending AISV requests, one of the reasoning-acting agents 720 may initiate an AISV process for the next request in the queue. To perform the AISV process, the reasoning-acting agent 720 may generate appropriate requests and calls (e.g., HTTP requests, API calls) to the remotely-located grounded CV models 708, VLMs 710, and LLMs 712 and process the results received. For example, the reasoning-acting agents 720 may provide the results received from the grounded CV models 708, VLMs 710, and LLMs 712 to the data store 724 for storage (e.g., during the AISV process). The reasoning-acting agents 720, in this example, also may provide other data related to the AISV process to the data store 724 for storage. For example, the reasoning-acting agents 720 may stream the reasoning, checklists, and questions generated during an AISV process to the data store 124 for storage. The data store 124, in this example, also may store the status (job status) of an AISV process (e.g., pending, processing, com-pleted). In some implementations, the reasoning-acting agents 720 may be configured to invoke backup (fallback) AI tools in the event a default AI tool (e.g., a default grounded CV model, a default VLM, or a default LLM) is unavailable or slow to respond.

The status service 726, in this example, is configured to respond to status requests received from the computing devices 702 regarding their respective AISV requests. Given the "cloud"-based implementation, the client (e.g., end user) may perceive an appreciable amount of time between send-ing the request and receiving the results (e.g., due to network congestion, other pending requests, etc.). The status service 726 may thus provide the status service 726 as a means to provide updates to the client while the request is pending or being processed. Status requests may include requests for a summary of the reasoning generated by a reasoning-acting agent for an AISV process or a request for the final results of an AISV process. The status service 726, in this example, is thus configured to summarize the reasoning generated by the reasoning-acting agents 720 that is stored in the data store 724 as well as parse the results of the AISV processes that are stored in the data store. As described herein, the final results may include a determination of whether the state of a target is the desired state of the target and checklists of what could and could not be verified during the AISV process. The status service 726 may be configured to prepare and provide a status update with the reasoning summary or final results in response to a status request from the com-puting devices 702. The status requests may include the unique identifier (e.g., job ID) assigned to the AISV request to facilitate retrieval of relevant AISV data from the data store 724. In some implementations, the application 714 at the computing devices may be configured to poll the status service 726 for a status update (e.g., at regular or irregular intervals, on-demand in response to receiving a user com-mand). In some implementations, the status agent may be configured to push updates to the application 714 at the computing devices 702.

Figure 8:
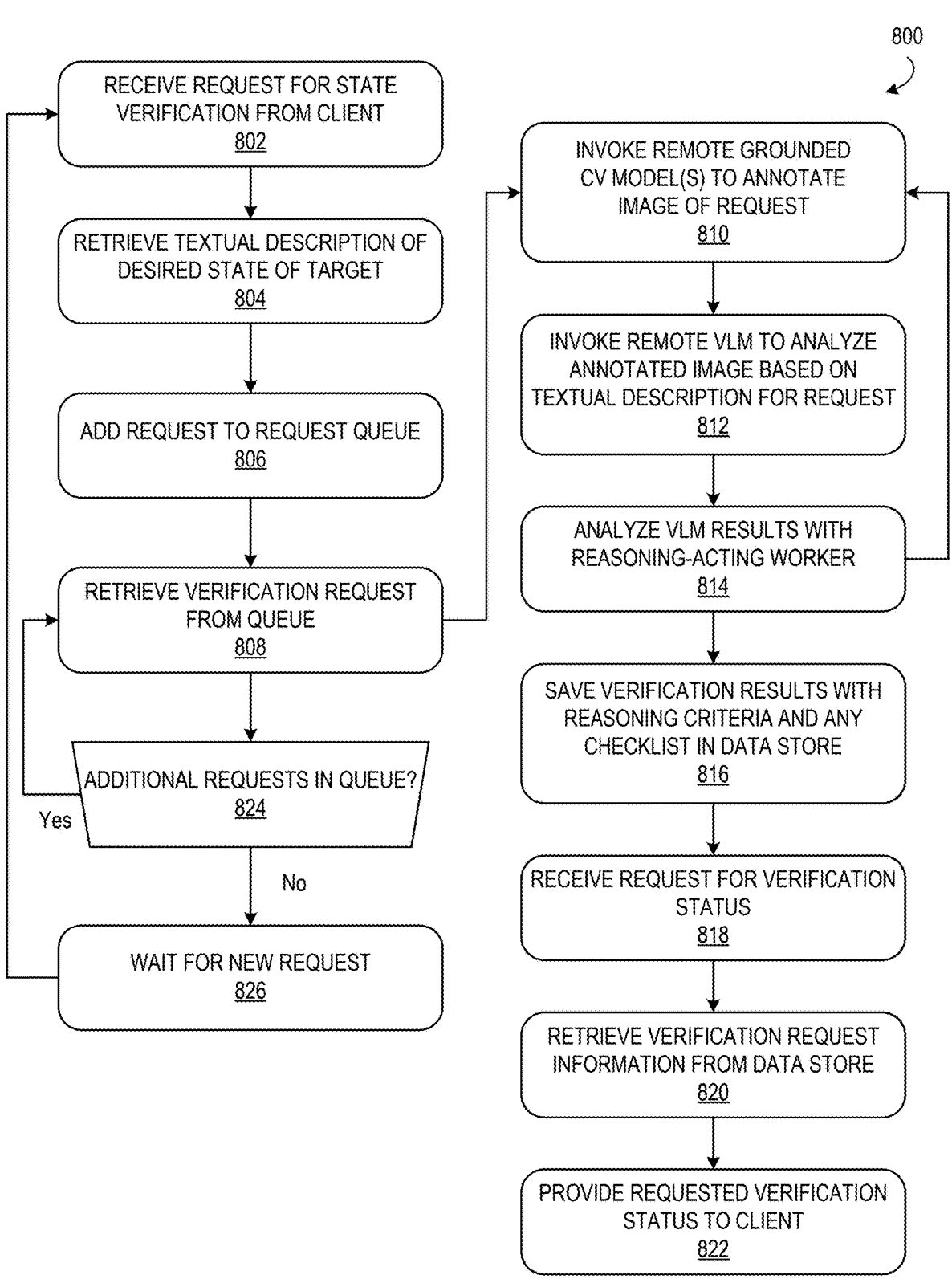
FIG. 8 shows a flowchart of example method steps for processing AI state verification requests using a "cloud"-based implementation.

In FIG. 8, a flowchart 800 of example method steps for processing AISV requests using a "cloud"-based implemen-tation is shown. As described herein, a request for state verification may be received from a client computing device (step 802). The semantic textual description of the desired state of the target of the AISV request may be retrieved (step 804). The AISV request may be added to the AISV request queue (step 806). In some implementations, the semantic textual description of the desired state of the target may be retrieved after adding the AISV request to the queue. A reasoning-acting agent (worker) may retrieve a pending AISV request from the queue (808). The reasoning-acting agent may invoke one or more remote grounded CV models to annotate the image of the target included in the request (step 810) as described herein. The reasoning-acting agent also may invoke a VLM to analyze the annotated image based on the semantic textual description for the desired state of the target of the request (step 812) as described herein. The reasoning-acting agent may then analyze the results generated by the VLM (step 814) as described herein. As described herein, the AISV process may be an iterative process that provides the reasoning-acting agent with suffi-cient information to render a decision as to whether the state of the target is or is not the desired state of the target. As such, the reasoning-acting agent may iteratively invoke (e.g., prompt) the remote, "cloud"-based models (e.g., the grounded CV models, the VLM) in order to obtain additional details regarding the image of the target, for example, to generate additional annotations for the image, to generate additional textual descriptions of the image, and so forth. Accordingly, the reasoning-acting agent may perform multiple iterations that invoke the remote grounded CV models to generate annotations of the image (step 810), invoke the remote VLM the analyze the annotated image (step 812), and analyze the results generated by the VLM (step 814) as many times as needed in order to render a decision as to whether the state of the target is the desired state of the target. The reasoning-acting agent may save the results of the AISV process along with any reasoning criteria and checklists generated to the data store (step 816) as described herein. A status agent may receive a request for a status update from the client computing device (step 818). In response to the status request, the status agent may retrieve data associated with the ASIV request from the data store (step 820) and provide a status update to the client computing device (step 822) as described herein. If the AISV request queue includes pending AISV requests (step 824: Yes), a reasoning-acting agent may retrieve the next AISV request from the queue (step 808) and repeat the steps described above to process the next AISV request in the queue. If the AISV queue does not include any pending AISV requests (step 824: No), then the reasoning-acting agents may wait for a new AISV request to be received from the client computing devices (step 826).

Figure 9:
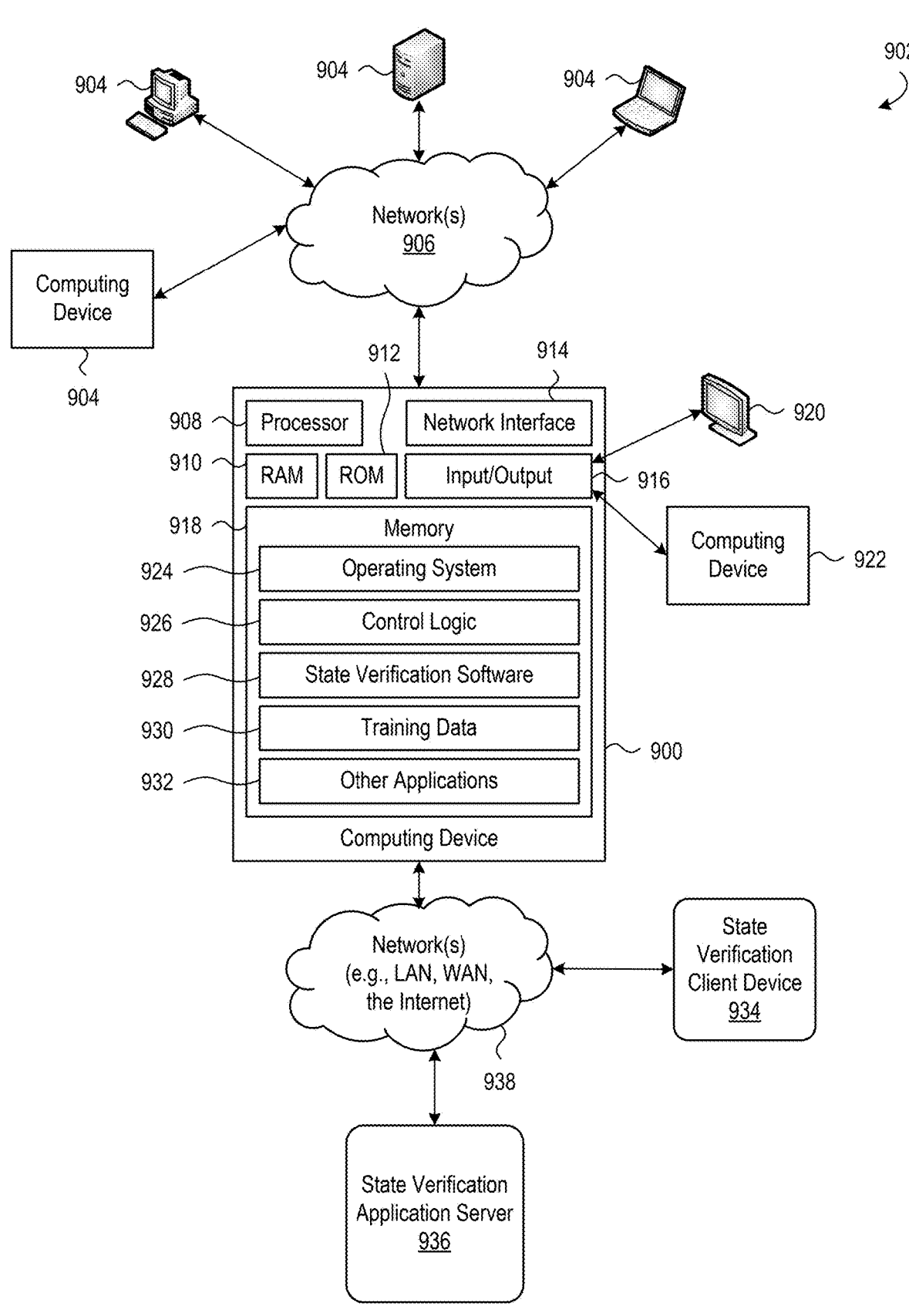
FIG. 9 shows a block diagram of an example of a computing device 900.

FIG. 9 shows a block diagram of an example of a computing device 900 that may be used in implementing one or more aspects of a state verification system 902 as described herein. For example, a computing device such as the computing device 900 may, in some examples, implement one or more aspects of the disclosure by reading and/or executing instructions and performing one or more actions based on the instructions. The computing device 900 may represent, be incorporated in, and/or include various devices such as a desktop computer, a computer server, a mobile device (e.g., a laptop computer, a tablet computer, a "smart" phone, wearable computing devices, other types of mobile computing devices, and the like), and/or any other type of data processing device.

The computing device 900 may, in some examples, operate in a standalone environment. In other examples, the computing device 900 may operate in a networked environment. As seen in FIG. 9, various nodes 904 may be interconnected via a network 906, such as the Internet. Other networks may additionally or alternatively be used, including private intranets, corporate networks, LANs, wireless networks, personal networks (PAN), etc. The network 906 shown in FIG. 9 is for illustration purposes and may be replaced with fewer or additional computer networks. A LAN may have one or more of any known LAN topology and may use one or more of a variety of different protocols, such as Ethernet. The devices shown in FIG. 9 and other devices (not shown) may be connected to one or more of the networks via twisted pair wires, coaxial cable, fiber optics, radio waves or other communication media.

As seen in FIG. 9, the computing device 900 may include a processor 908, RAM 910, ROM 912, network interface 914, input/output interfaces 916 (e.g., keyboard, mouse, display, printer, etc.), and memory 918. The processor 908 may include one or more computer processing units (CPUs), graphical processing units (GPUs), and/or other processing units such as a processor adapted to perform computations associated with verifying the state of a system using an iterative methodology and/or forms of machine learning. The I/O 916 may include a variety of interface units and drives for reading, writing, displaying, and/or printing data or files. The I/O 916 may be coupled with a display 920 and/or with another computing device 922. The memory 918 may store software for configuring the computing device into a special purpose computing device in order to perform one or more of the various functions discussed herein. The memory 918 may store operating system software 924 for controlling overall operation of the computing device 900, control logic 926 for instructing computing device to perform aspects discussed herein, state verification software 928 configured to perform any of the processes and/or methods described above, training data 930 that is usable to train any or all of the machine-learning models configured for modeling verifying the state of a system, and other applications 932. The control logic 926 may be incorporated in and may be a part of the state verification software 928. In other examples, the computing device 900 may include two or more of any and/or all of these components (e.g., two or more processors, two or more memories, etc.) and/or other components and/or subsystems not illustrated here.

The other devices and/or systems shown in FIG. 9 may have similar or different architecture as described with respect to the computing device 900. Those of skill in the art will appreciate that the functionality of the computing device 900 (or other computing devices) as described herein may be spread across multiple data processing devices, for example, to distribute processing load across multiple computers, to segregate transactions based on expected parallel processing efficiencies, geographic location, user access level, quality of service (QOS), to use cloud-based computing services, etc. For example, multiple computing devices may operate in concert to provide parallel computing features in support of the operation of the control logic, state verification software, and/or the other applications.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or Python. The modules may use one or more markup languages such as (but not limited to) HTML (Hypertext Markup Language) or XML (Extensible Markup Language) to provide functionality related to aspects described herein. The computer-executable instructions may be stored on a computer readable medium such as a hard disk, optical disk, removable storage media, solid state memory, RAM, etc. The functionality of the program modules may be combined or distributed as desired in various embodiments. The functionality also may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

The computing device 900 may be in signal communication with one or more state verification client devices of 934 as described herein. The computing device 900 also may be in signal communication with one or more state verification application servers 936 as also described herein. The computing device 900 may be in signal communication with the state verification client devices 934 and state verification application servers 936 via one or more networks 938 as described herein.

Although the subject matter has been described in language specific to structural features and/or methodological acts, it is to be understood that the subject matter defined in any statement of examples is not necessarily limited to the specific features or acts described above. Furthermore, while aspects of the present disclosure have been described in terms of preferred examples, and it will be understood that the disclosure is not limited thereto since modifications may be made to those skilled in the art, particularly in light of the foregoing teachings. For example, although various examples are described herein, features and/or steps of those examples may be combined, divided, omitted, rearranged, revised, and/or augmented in any desired manner. Various alterations, modifications, and improvements will be appreciated by those skilled in the art and are intended to be part of this description, even if not expressly stated herein, and are intended to be within the spirit and scope of the disclosures herein. The disclosures herein, therefore, are by way of example only and are not limiting.

What is claimed is:

1. A computer-implemented method comprising:
receiving, by a computing system, a digital image depicting a state of a system;
obtaining a semantic textual description of a desired state of the system;
generating at least one annotation of the digital image using a grounded computer vision (CV) model;
prompting, using a large language model (LLM) configured with chain-of-thought reasoning, a vision-language model (VLM) to describe the digital image based on the semantic textual description of the desired state and the at least one annotation;
determining that the LLM cannot verify whether the state of the system is the desired state of the system based on a textual description of the digital image generated by the VLM;
iteratively prompting the VLM using the LLM until the LLM can verify whether the state of the system is the desired state of the system, wherein each iteration comprises:
generating a prompt for the VLM based on reasoning generated by the LLM during a prior iteration; and
prompting the VLM to describe the digital image based on the prompt; and
based on determining that the LLM can verify whether the state of the system is the desired state of the system, causing output of an indication of whether the state of the system is the desired state of the system.

2. The computer-implemented method of claim 1, further comprising causing output of reasoning used by the LLM to determine the indication of whether the state of the system is the desired state of the system.

3. The computer-implemented method of claim 1, further comprising, based on the state of the system not being the desired state of the system:
generating, using the LLM and based on reasoning generated by the LLM, a list of one or more aspects of the system that the LLM could not determine; and
causing output of the list.

4. The computer-implemented method of claim 3, further comprising:
receiving user input regarding a state of the one or more aspects of the list; and
determining whether the state of the system is the desired state of the system based on the user input.

5. The computer-implemented method of claim 1, wherein at least one iteration comprises generating at least one additional annotation of the digital image using the grounded CV model, and wherein prompting the VLM to describe the digital image based on the prompt comprises prompting the VLM to describe the digital image also based on the at least one additional annotation.

6. The computer-implemented method of claim 1, wherein generating the at least one annotation comprises:
semantically labeling at least one object of the system depicted in the digital image; and
enumerating the at least one object of the system depicted in the digital image.

7. The computer-implemented method of claim 1, further comprising:
storing, in a data store, reasoning generated by the LLM regarding the state of the system;
generating, using an LLM, a summary of the reasoning stored in the data store; and
causing output of the summary before output of the indication of whether the state of the system is the desired state of the system.

8. A computing system comprising:
one or more processors; and
memory storing executable instructions that, when executed by the one or more processors, cause the computing system to:
receive a digital image depicting a state of a system;
obtain a semantic textual description of a desired state of the system;
generate at least one annotation of the digital image using a grounded computer vision (CV) model;
prompt, using a large language model (LLM) configured with chain-of-thought reasoning, a vision-language model (VLM) to describe the digital image based on the semantic textual description of the desired state and the at least one annotation;
determine that the LLM cannot verify whether the state of the system is the desired state of the system based on a textual description of the digital image generated by the VLM;
iteratively prompt the VLM using the LLM until the LLM can verify whether the state of the system is the desired state of the system, wherein each iteration comprises:
generate a prompt for the VLM based on reasoning generated by the LLM during a prior iteration; and
prompt the VLM to describe the digital image based on the prompt; and
based on determining that the LLM can verify whether the state of the system is the desired state of the system, cause output of an indication of whether the state of the system is the desired state of the system.

9. The computing system of claim 8, wherein the instructions, when executed by the one or more processors, further cause the computing system to cause output of reasoning used by the LLM to determine the indication of whether the state of the system is the desired state of the system.

10. The computing system of claim 8, wherein the instructions, when executed by the one or more processors, further cause the computing system to, based on the state of the system not being the desired state of the system:

generate, using the LLM and based on reasoning generated by the LLM, a list of one or more aspects of the system that the LLM could not determine; and cause output of the list.

11. The computing system of claim 10, wherein the instructions, when executed by the one or more processors, further cause the computing system to:

receive user input regarding a state of the one or more aspects of the list; and determine whether the state of the system is the desired state of the system based on the user input.

12. The computing system of claim 8, wherein at least one iteration comprises generating at least one additional annotation of the digital image using the grounded CV model, and wherein the instructions, when executed by the one or more processors, causes the computing system to prompt the VLM to describe the digital image also based on the at least one additional annotation.

13. The computing system of claim 8, wherein the instructions, when executed by the one or more processors, further cause the computing system to generate the at least one annotation at least by:

semantically labeling at least one object of the system depicted in the digital image; and enumerating the at least one object of the system depicted in the digital image.

14. The computing system of claim 8, wherein the instructions, when executed by the one or more processors, further cause the computing system to:

store, in a data store, reasoning generated by the LLM regarding the state of the system;

generate, using an LLM, a summary of the reasoning stored in the data store; and cause output of the summary before output of the indication of whether the state of the system is the desired state of the system.

15. A non-transitory computer-readable medium storing executable instructions that, when executed by one or more processors of a computing system, configure the computing system to:

receive a digital image depicting a state of a system;

obtain a semantic textual description of a desired state of the system;

generate at least one annotation of the digital image using a grounded computer vision (CV) model;

prompt, using a large language model (LLM) configured with chain-of-thought reasoning, a vision-language model (VLM) to describe the digital image based on the semantic textual description of the desired state and the at least one annotation;

determine that the LLM cannot verify whether the state of the system is the desired state of the system based on a textual description of the digital image generated by the VLM;

iteratively prompt the VLM using the LLM until the LLM can verify whether the state of the system is the desired state of the system, wherein each iteration comprises:

generate a prompt for the VLM based on reasoning generated by the LLM during a prior iteration; and prompt the VLM to describe the digital image based on the prompt; and based on determining that the LLM can verify whether the state of the system is the desired state of the system, cause output of an indication of whether the state of the system is the desired state of the system.

16. The non-transitory computer-readable medium of claim 15, wherein the instructions, when executed, further configure the computing system to cause output of reasoning used by the LLM to determine the indication of whether the state of the system is the desired state of the system.

17. The non-transitory computer-readable medium of claim 15, wherein the instructions, when executed, further configure the computing system to:

generate, using the LLM and based on reasoning generated by the LLM, a list of one or more aspects of the system that the LLM could not determine;

cause output of the list;

receive user input regarding a state of the one or more aspects of the list; and determine whether the state of the system is the desired state of the system based on the user input.

18. The non-transitory computer-readable medium of claim 15, wherein at least one iteration comprises generating at least one additional annotation of the digital image using the grounded CV model, and wherein the instructions, when executed, configures the computing system to prompt the VLM to describe the digital image also based on the at least one additional annotation.

19. The non-transitory computer-readable medium of claim 15, wherein the instructions, when executed, further configure the computing system to generate the at least one annotation at least by:

semantically labeling at least one object of the system depicted in the digital image; and enumerating the at least one object of the system depicted in the digital image.

20. The non-transitory computer-readable medium of claim 15, wherein the instructions, when executed, further configure the computing system to:

store, in a data store, reasoning generated by the LLM regarding the state of the system;

generate, using an LLM, a summary of the reasoning stored in the data store; and cause output of the summary before output of the indication of whether the state of the system is the desired state of the system.

\* \* \* \* \*